(12) United States Patent
Beye et al.

(10) Patent No.: US 11,632,675 B2
(45) Date of Patent: *Apr. 18, 2023

(54) UTILIZING A HIGH GENERATION CELLULAR NETWORK TO AUTHORIZE AN EVENT

(71) Applicant: Bank of America Corporation, Charlotte, NC (US)

(72) Inventors: Rick A. Beye, Highland Beach, FL (US); Monika Kapur, Jacksonville, FL (US)

(73) Assignee: Bank of America Corporation, Charlotte, NC (US)

(*) Notice: Subject to any disclaimer, the term of this patent is extended or adjusted under 35 U.S.C. 154(b) by 0 days.

This patent is subject to a terminal disclaimer.

(21) Appl. No.: 17/950,377

(22) Filed: Sep. 22, 2022

(65) Prior Publication Data
US 2023/0016590 A1    Jan. 19, 2023

Related U.S. Application Data

(63) Continuation of application No. 16/456,576, filed on Jun. 28, 2019, now Pat. No. 11,523,276.

(51) Int. Cl.
*H04W 12/06* (2021.01)
*H04L 9/40* (2022.01)
*H04W 12/08* (2021.01)

(52) U.S. Cl.
CPC ......... *H04W 12/06* (2013.01); *H04L 63/0853* (2013.01); *H04L 63/0861* (2013.01); *H04W 12/08* (2013.01)

(58) Field of Classification Search
CPC .......... H04L 63/0861; H04L 63/0853; H04W 12/06; H04W 12/08; G06F 21/32; G06F 21/35
See application file for complete search history.

(56) References Cited

U.S. PATENT DOCUMENTS

| 8,646,060 B1 | 2/2014 | Ben Ayed |
| 8,819,445 B2 | 8/2014 | Schrecker |

(Continued)

OTHER PUBLICATIONS

M. Haus, M. Waqas, A. Y. Ding, Y. Li, S. Tarkoma and J. Ott, "Security and Privacy in Device-to-Device (D2D) Communication: A Review," in IEEE Communications Surveys & Tutorials, vol. 19, No. 2, pp. 1054-1079, Secondquarter 2017. (Year: 2017).*

(Continued)

*Primary Examiner* — Kari L Schmidt
(74) *Attorney, Agent, or Firm* — Banner & Witcoff, Ltd.

(57) ABSTRACT

Aspects of the disclosure relate to authorizing an event by utilizing a high generation cellular network to authenticate a device associated with the event. A computing platform may receive, from a first device, a request to authorize an event. Subsequently, the computing platform may identify, based on an analysis of location data, that a second device is proximate to the first device. The computing platform may then prompt the second device to authenticate the first device. Then, the computing platform may receive, from the second device, an authentication token indicating whether the first device is authenticated. Based on the authentication token, the computing platform may respond to the request to authorize the event.

20 Claims, 11 Drawing Sheets

(56) References Cited

U.S. PATENT DOCUMENTS

| | | |
|---|---|---|
| 8,922,342 B1 | 12/2014 | Ashenfelter et al. |
| 9,094,388 B2 | 7/2015 | Tkachev |
| 9,119,539 B1 | 9/2015 | Dotan et al. |
| 9,264,419 B1 | 2/2016 | Johansson et al. |
| 9,350,717 B1 | 5/2016 | Siddiqui |
| 9,639,689 B1 | 5/2017 | Herskovic et al. |
| 9,659,160 B2 | 5/2017 | Ligatti et al. |
| 9,787,622 B2 | 10/2017 | Reddy et al. |
| 9,788,211 B2 | 10/2017 | Zhang |
| 9,940,616 B1 | 4/2018 | Morgan et al. |
| 9,961,624 B1 | 5/2018 | Zait |
| 10,057,255 B2 | 8/2018 | Votaw et al. |
| 10,064,052 B2 | 8/2018 | Peluso et al. |
| 10,121,142 B2 | 11/2018 | Grigg et al. |
| 10,136,264 B2 | 11/2018 | Scarafia et al. |
| 10,148,631 B1 | 12/2018 | Sokolov et al. |
| 10,257,668 B2 | 4/2019 | Shaw et al. |
| 10,659,453 B2 | 5/2020 | Huang |
| 10,771,458 B1 | 9/2020 | Xia et al. |
| 10,855,664 B1 | 12/2020 | Ziraknejad et al. |
| 11,075,903 B2 | 7/2021 | Allinson et al. |
| 11,132,694 B2 | 9/2021 | Mercille |
| 2006/0294585 A1 | 12/2006 | Sadovsky et al. |
| 2011/0314153 A1 | 12/2011 | Bathiche et al. |
| 2012/0273568 A1 | 11/2012 | Dlott et al. |
| 2013/0055370 A1 | 2/2013 | Goldberg et al. |
| 2013/0082819 A1 | 4/2013 | Cotterill |
| 2013/0226800 A1 | 8/2013 | Patel et al. |
| 2013/0254100 A1 | 9/2013 | Jones et al. |
| 2014/0259129 A1 | 9/2014 | Copsey |
| 2014/0380419 A1 | 12/2014 | Peluso et al. |
| 2015/0106955 A1 | 4/2015 | Soelberg et al. |
| 2015/0128240 A1 | 5/2015 | Richards et al. |
| 2015/0229650 A1 | 8/2015 | Grigg et al. |
| 2016/0134609 A1 | 5/2016 | Durham et al. |
| 2016/0205149 A1 | 7/2016 | Burch et al. |
| 2016/0212100 A1 | 7/2016 | Banerjee |
| 2016/0306955 A1 | 10/2016 | Martin et al. |
| 2016/0344730 A1 | 11/2016 | Holz |
| 2016/0364610 A1 | 12/2016 | Jung et al. |
| 2017/0078280 A1 | 3/2017 | Oberheide et al. |
| 2017/0085568 A1 | 3/2017 | Rolfe et al. |
| 2017/0295173 A1 | 10/2017 | Walsh et al. |
| 2017/0331817 A1 | 11/2017 | Votaw et al. |
| 2018/0048630 A1 | 2/2018 | Griffin |
| 2018/0103341 A1 | 4/2018 | Moiyallah, Jr. et al. |
| 2018/0152910 A1 | 5/2018 | Ryu et al. |
| 2018/0167812 A1* | 6/2018 | Nagarajamoorthy ........................ H04B 17/318 |
| 2018/0212970 A1 | 7/2018 | Chen et al. |
| 2018/0234411 A1 | 8/2018 | Masiero et al. |
| 2018/0253737 A1 | 9/2018 | Hanis et al. |
| 2018/0295128 A1 | 10/2018 | Drake, II et al. |
| 2018/0316671 A1 | 11/2018 | Brown |
| 2019/0045477 A1 | 2/2019 | Edge |
| 2019/0053010 A1 | 2/2019 | Edge et al. |
| 2019/0124056 A1 | 4/2019 | Monibi et al. |
| 2019/0319965 A1 | 10/2019 | Brown et al. |
| 2019/0373300 A1* | 12/2019 | Govila ............... H04N 21/4432 |
| 2020/0074466 A1* | 3/2020 | Kurian ................... G06Q 20/10 |
| 2020/0136826 A1 | 4/2020 | Sharma et al. |
| 2020/0169874 A1 | 5/2020 | Wagner |
| 2020/0242222 A1 | 7/2020 | Machani et al. |
| 2020/0302086 A1 | 9/2020 | Post |
| 2020/0351660 A1 | 11/2020 | Avetisov et al. |
| 2020/0366665 A1 | 11/2020 | Vasudevan et al. |
| 2021/0185095 A1 | 6/2021 | Harel et al. |
| 2022/0109663 A1* | 4/2022 | Swain ..................... H04L 63/08 |
| 2022/0329581 A1* | 10/2022 | Zaki ........................ G06F 9/451 |

OTHER PUBLICATIONS

M. Ahmed, Y. Li, M. Waqas, M. Sheraz, D. Jin and Z. Han, "A Survey on Socially Aware Device-to-Device Communications," in IEEE Communications Surveys & Tutorials, vol. 20, No. 3, pp. 2169-2197, thirdquarter 2018. (Year: 2018).*

Do, Cuong T., et al. "Game theory for cyber security and privacy." ACM Computing Surveys (CSUR) 50.2 (2017): 1-37. (Year: 2017).*

M. Haus, et al., "Security and Privacy in Device-to-Device (D2D) Communication: A Review," in IEEE Communications Surveys & Tutorials, vol. 19, No. 2, pp. 1054-1079, Secondquarter 2017. (Year: 2017).

Ligatti, Jay, et al. "Coauthentication", Proceedings of the 34th ACM/SIGAPP Symposium on Applied Computing. 2019, pp. 1906-1915; (Year: 2019).

* cited by examiner

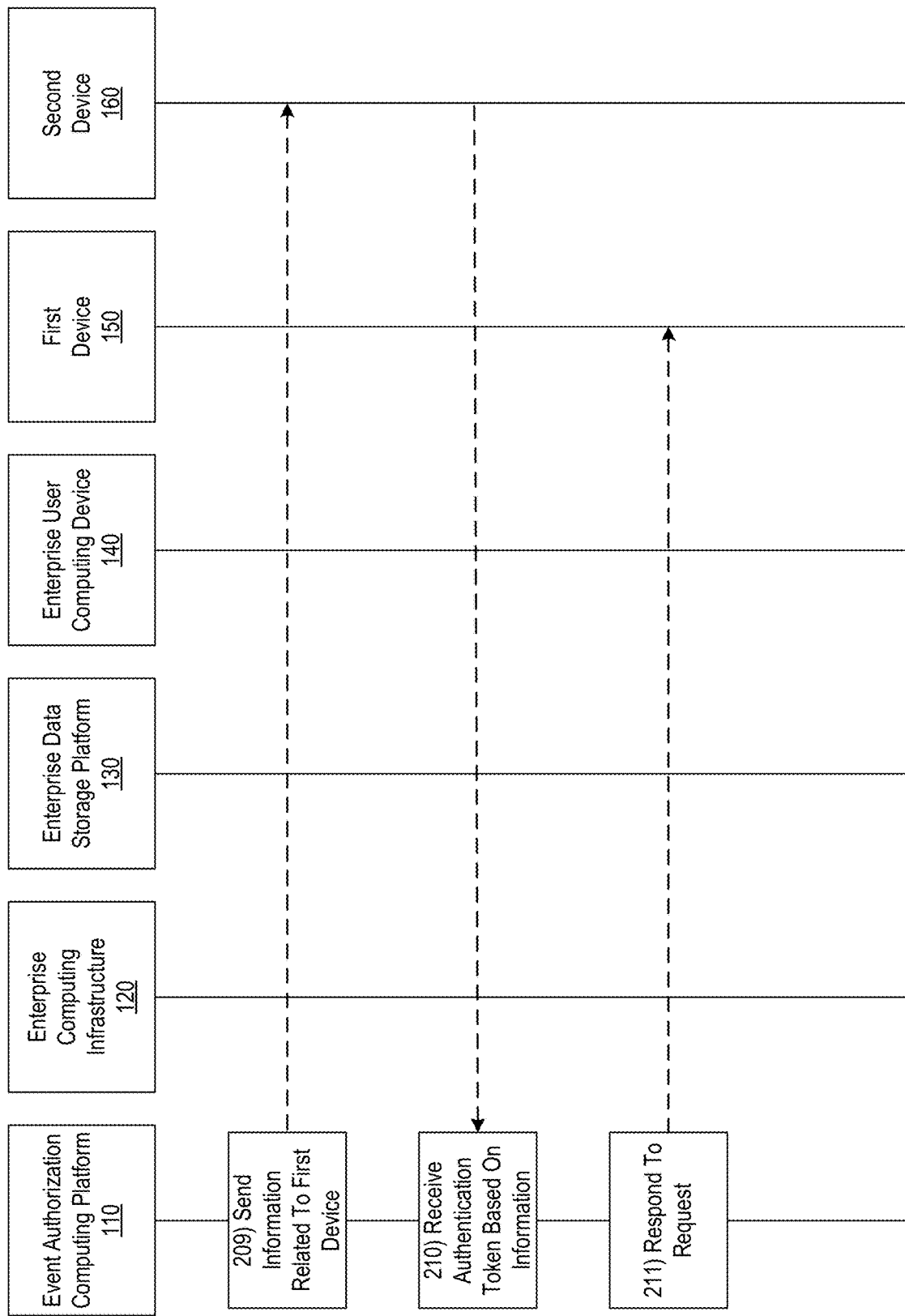

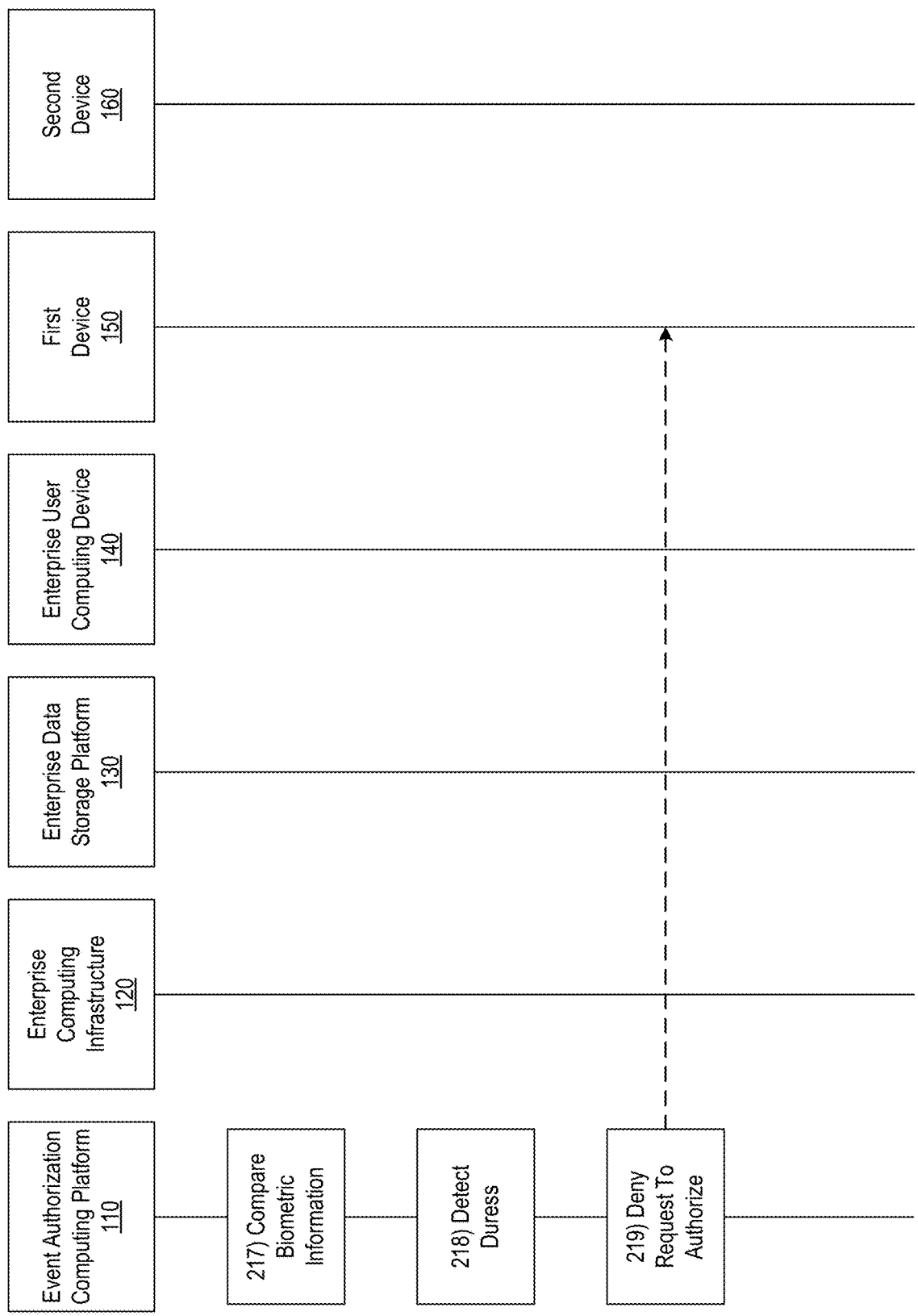

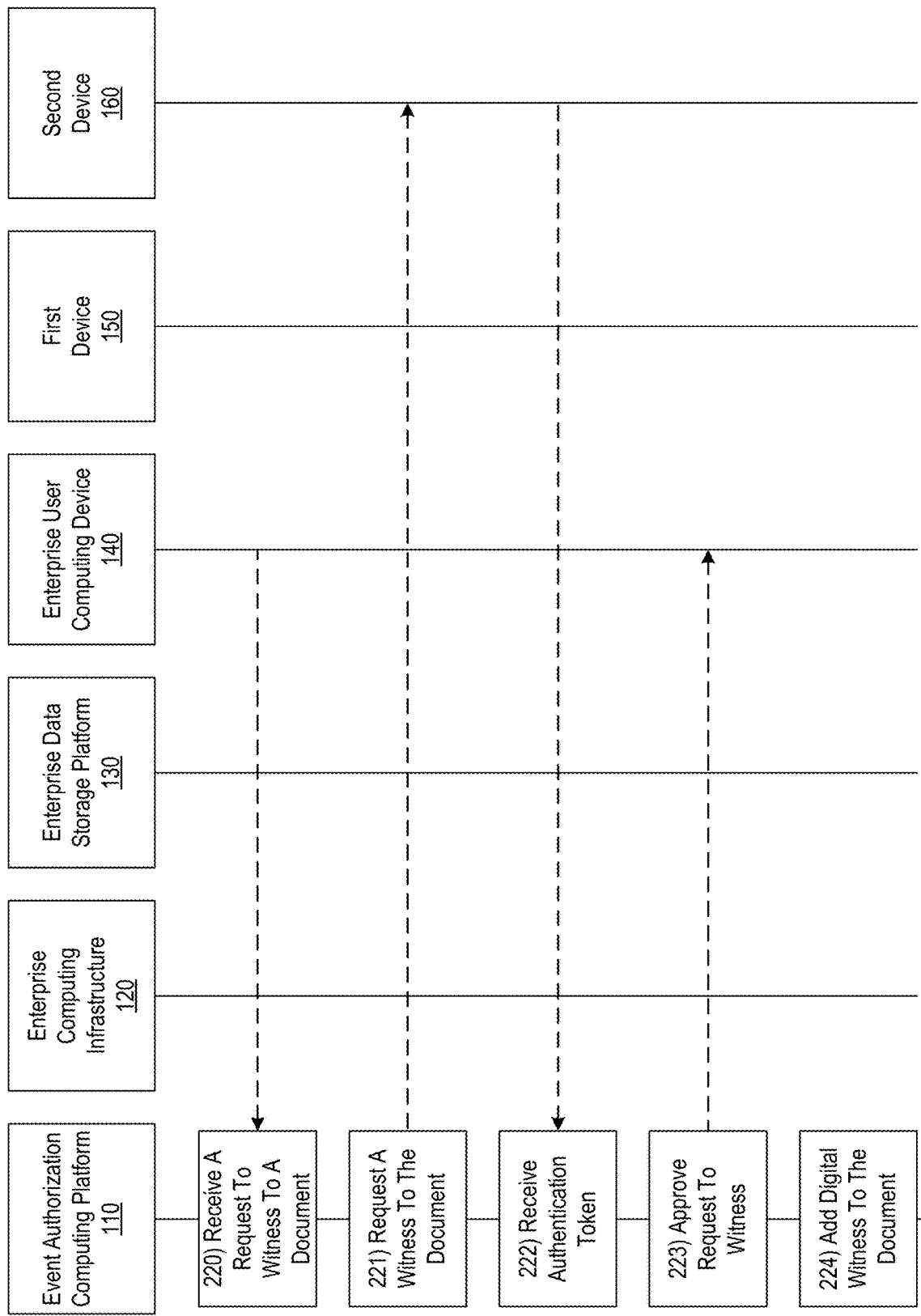

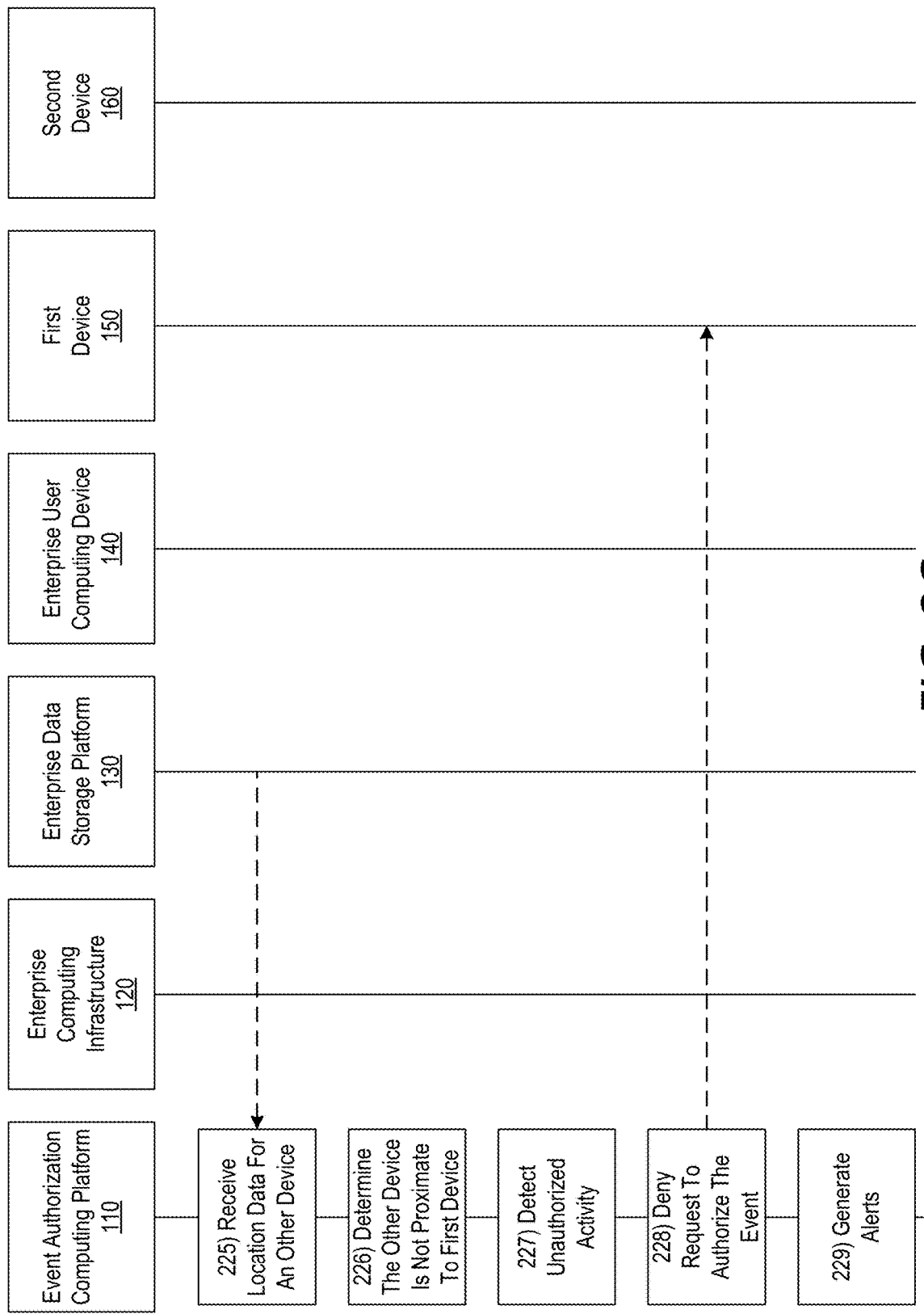

UTILIZING A HIGH GENERATION CELLULAR NETWORK TO AUTHORIZE AN EVENT

CROSS REFERENCE TO RELATED APPLICATIONS

This application is a continuation of and claims priority to patent application Ser. No. 16/456,576 entitled "Utilizing a High Generation Cellular Network to Authorize an Event" filed on Jun. 28, 2019, which is incorporated by reference in its entirety.

BACKGROUND

Aspects of the disclosure relate to deploying digital data processing systems, providing information security, and preventing unauthorized access to resources of enterprise systems. In particular, one or more aspects of the disclosure relate to authorizing an event by utilizing a high generation cellular network to authenticate a device associated with the event.

Enterprise organizations may utilize various computing infrastructure to transact business with their customers. Such transactions may include confidential information and/or other sensitive data that is created and/or used for various purposes. In some instances, such business transaction events may need to access customer information over various networks and/or between various computer systems. Ensuring authenticity of a device associated with an event when accessing such data and being able to authorize the event with speed and accuracy may be critically important to protect the integrity and confidentiality of the underlying information, ensure authenticity of the transaction, deter unauthorized transactions, and maintain customer satisfaction. In many instances, however, it may be difficult to authorize events by ensuring authenticity of users or devices associated with the event while also attempting to optimize the resource utilization, bandwidth utilization, and efficient operations of the computing infrastructure involved in maintaining, accessing, and executing the transaction.

SUMMARY

Aspects of the disclosure provide effective, efficient, scalable, fast, reliable, and convenient technical solutions that address and overcome the technical problems associated with authorizing an event by utilizing a high generation cellular network to authenticate a device associated with the event.

In accordance with one or more embodiments, a computing platform having at least one processor, a communication interface, and memory may receive, via the communication interface, from a first device, a request to authorize an event. Subsequently, the computing platform may identify, based on an analysis of location data, that a second device is proximate to the first device. Then, the computing platform may prompt the second device to authenticate the first device. Then, the computing platform may receive, from the second device, an authentication token indicating whether the first device is authenticated. Based on the authentication token, the computing platform may then respond to the request to authorize the event.

In some embodiments, receiving the authentication token may include causing the second device to send, via a local network, the authentication token to the first device, and then receiving the authentication token from the first device.

In some embodiments, prompting the second device to authenticate the first device may include providing, to the second device, information related to the first device, and prompting the second device to verify the information. In some embodiments, the information related to the first device may include information associated with a user associated with the first device In some embodiments, prompting the second device to authenticate the first device may include determining a confidence level associated with the second device. In some embodiments, determining the confidence level associated with the second device may include identifying an association, in a repository of user devices, between the first device and the second device, and determining the confidence level based on the identified association. In some embodiments, determining the confidence level associated with the second device may include receiving biometric information associated with a user associated with the second device, and determining the confidence level of the second device based on the biometric information. In some embodiments, determining the confidence level associated with the second device may include comparing the received biometric information with known biometric information associated with the user associated with the second device, detecting, based on the comparing, duress involving the user associated with the second device, and in response to detecting the duress, deny the request to authorize the event.

In some embodiments, responding to the request to authorize the event may include confirming the request, and adding, based on the authentication token, a digital witness to a document associated with the event.

In some embodiments, identifying the second device may include accessing a repository of trusted devices, and confirming that the second device is in the repository of trusted devices.

In some embodiments, receiving the authentication token may include detecting an absence of a response to the prompt within a time threshold. In some embodiments, responding, based on the authentication token, to the request to authorize the event may include identifying that a third device is proximate to the first device, then prompting the third device to authenticate the first device, then receiving, from the third device, a second authentication token indicating whether the first device is authenticated, and then responding, based on the second authentication token, to the request to authorize the event.

In some embodiments, the computing platform may, after receiving, from the first device, the request to authorize the event, establish, with the first device, a first communication channel. Subsequently, the computing platform may, after identifying that the second device is proximate to the first device, establish, with the second device, a second communication channel different from the first communication channel. Then the computing platform may prompt the second device to authenticate the first device via the second communication channel. And subsequently, the computing platform may respond to the request to authorize the event via the first communication channel.

In some embodiments, the computing platform may identify, based on the analysis of the location data, that a third device is proximate to the first device and to the second device. Subsequently, the computing platform may prompt the third device to authenticate the second device. Then the computing platform may receive, from the third device, a second authentication token indicating whether the second device is authenticated. Subsequently, the computing platform may respond, based on the second authentication token, to the request to authorize the event.

In some embodiments, the authentication token may be indicative of a failure to authenticate the first device, and the computing platform may, in response to the failure to authenticate the first device, deny the request to authorize the event.

In some embodiments, the computing platform may detect, in response to the failure to authenticate the first device, unauthorized activity involving the first device.

In some embodiments, the computing platform may detect an unauthorized movement event involving the first smart data object based on the first data movement pattern corresponding to the first smart data object. Subsequently, the computing platform may generate one or more alert messages comprising alert information associated with the unauthorized activity involving the first device In some embodiments, the computing platform may determine, based on the analysis of the location data if a third device associated with the first device is proximate to the first device. Subsequently, the computing platform may detect, in response to a failure to determine that the third device is proximate to the first device, unauthorized activity involving the first device.

In some embodiments, the location data may be from a global positioning system. In some embodiments, the location data may be from a high generation cellular network.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2A-2G depict an illustrative event sequence for authorizing an event by utilizing a high generation cellular network to authenticate a device associated with the event in accordance with one or more example embodiments;

DETAILED DESCRIPTION

Figure 1A:
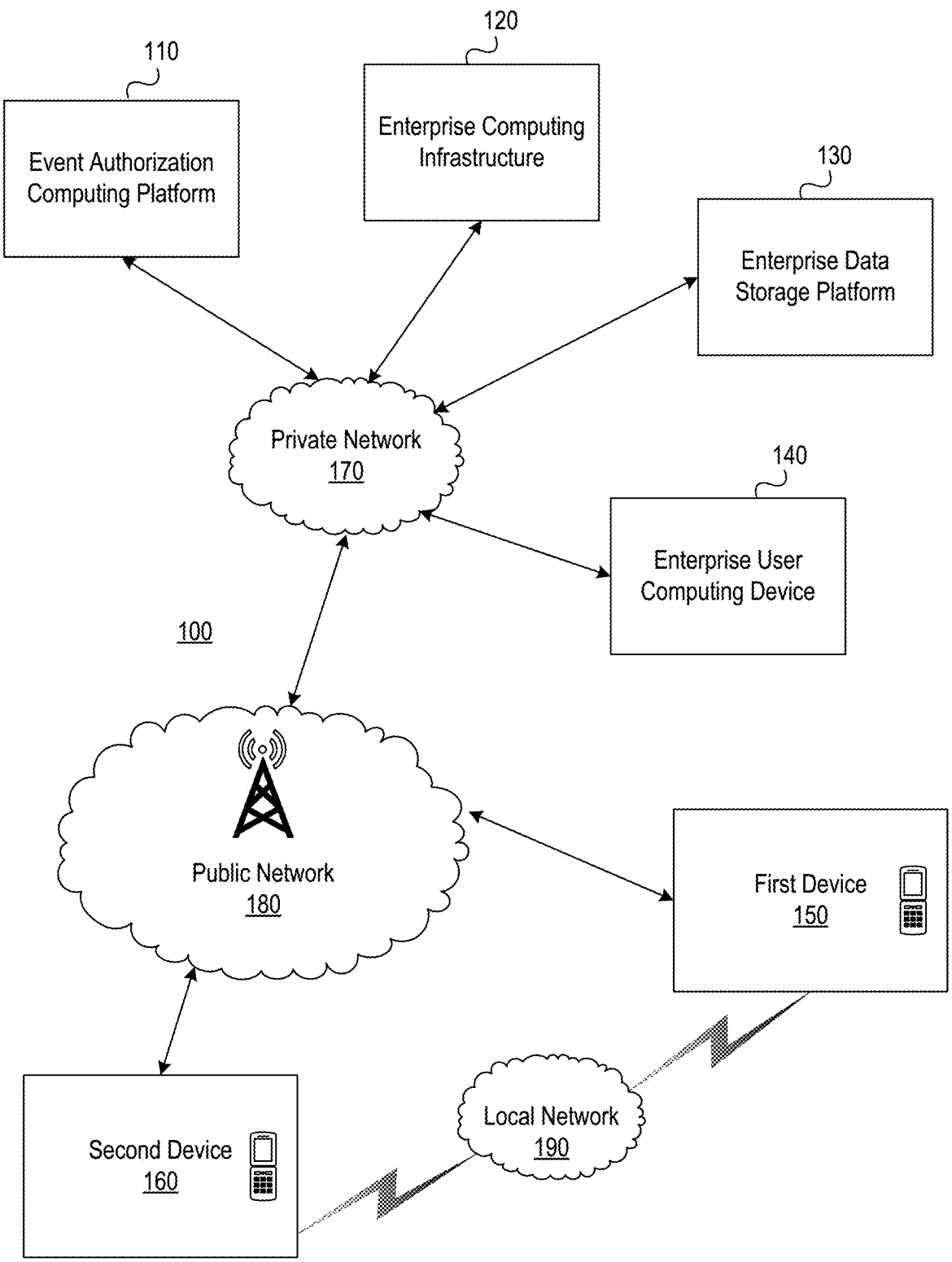
FIGS. 1A and 1B depict an illustrative computing environment for authorizing an event by utilizing a high generation cellular network to authenticate a device associated with the event in accordance with one or more example embodiments.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Some aspects of the disclosure relate to utilizing a high generation cellular network to authenticate devices that are attempting to complete a transaction. For example, a smart device mapping system may monitor user devices as they interact with a computing system through an operating environment, so that the system can know where such devices are located, who has access to the devices, and proximity between the devices. Accuracy of location data and speed of communication are key to authenticate the devices and authorize a requested event.

Cellular networks are generally associated with service areas that are subdivided into cells. Location data for devices are based on the cell within which the device is located. Accordingly, smaller cells provide greater accuracy and reliability of location data. High generation cellular networks, such as a fifth generation ("5G") cellular network, may be configured to considerably reduce the cell size, thereby improving accuracy of location data. Also, for example, in high generation cellular networks, each cell may be equipped with multiple antennas configured to communicate with the device within the cell so that multiple streams of data may be simultaneously transmitted, thereby increasing data transmission rates and enhancing speed and accuracy of communications.

In some instances, when a device associated with a user (e.g., a bank customer) interacts with a computing system through an operating environment, the smart device mapping system may be able to detect the device, identify its location with great accuracy, and also identify devices that are proximate to the device. For example, an enterprise mobile application installed on the device and associated with an enterprise server infrastructure may be activated when the device enters the operating environment (e.g., a queue at a cashier in a financial institution, a point of sales location). When the device associated with the user requests authorization for an event (e.g., withdraw funds from a banking institution, sign a document that requires a witness to the signature, make payments), location accuracy may be utilized to prompt an other proximate device to authenticate the device associated with the user, and high-speed data transmission rates may be utilized to receive an authentication token from the other device, and respond to the request to authorize the event.

Figure 1B:
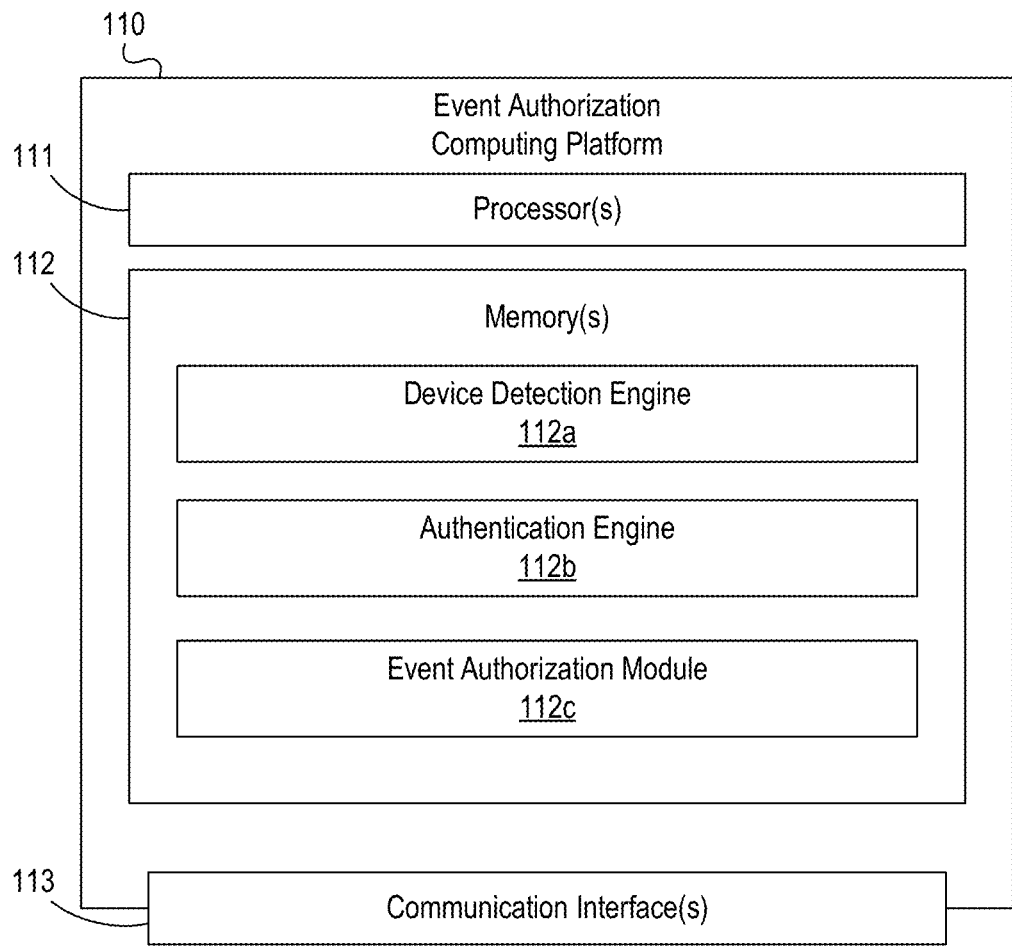

FIGS. 1A and 1B depict an illustrative computing environment for authorizing an event by utilizing a high generation cellular network to authenticate a device associated with the event in accordance with one or more example embodiments. Referring to FIG. 1A, computing environment 100 may include one or more computer systems. For example, computing environment 100 may include event authorization computing platform 110, enterprise computing infrastructure 120, enterprise data storage platform 130, enterprise user computing device 140, first device 150, and second device 160.

As illustrated in greater detail below, event authorization computing platform 110 may include one or more computing devices configured to perform one or more of the functions described herein. For example, event authorization computing platform 110 may include one or more computers (e.g., laptop computers, desktop computers, servers, server blades, or the like).

Enterprise computing infrastructure 120 may include one or more computing devices and/or other computer components (e.g., processors, memories, communication interfaces). In addition, enterprise computing infrastructure 120 may be configured to host, execute, and/or otherwise provide one or more enterprise applications. For example, enterprise computing infrastructure 120 may be configured to host, execute, and/or otherwise provide one or more transaction processing programs, loan application processing programs, an enterprise mobile application for user devices, and/or other programs associated with an enterprise organization, such as a financial institution. In some instances, enterprise computing infrastructure 120 may be configured to provide various enterprise and/or back-office computing functions for an enterprise organization, such as a financial institution. For example, enterprise computing infrastructure 120 may include various servers and/or databases that store and/or otherwise maintain account information, such as financial account information including account balances, transaction history, account owner information, and/or other information. In addition, enterprise computing infrastructure 120 may process and/or otherwise execute transactions on specific accounts based on commands and/or other information received from other computer systems included in computing environment 100. Additionally or alternatively, enterprise computing infrastructure 120 may receive authorization requests from event authorization computing platform 110 and return transaction data to event authorization computing platform 110 in response to such authorization requests, which may enable event authorization computing platform 110 to identify applications, environments, and/or policies associated with enterprise computing infrastructure 120 that may be relevant to the authorization requests.

Enterprise data storage platform 130 may include one or more computing devices and/or other computer components (e.g., processors, memories, communication interfaces). In addition, and as illustrated in greater detail below, enterprise data storage platform 130 may be configured to store and/or otherwise maintain enterprise data. Additionally or alternatively, enterprise computing infrastructure 120 may load data from enterprise data storage platform 130, manipulate and/or otherwise process such data, and return modified data and/or other data to enterprise data storage platform 130 and/or to other computer systems included in computing environment 100.

Enterprise user computing device 140 may be a personal computing device (e.g., desktop computer, laptop computer) or mobile computing device (e.g., smartphone, tablet). In addition, enterprise user computing device 140 may be linked to and/or used by a specific enterprise user (who may, e.g., be an employee or other affiliate of an enterprise organization operating event authorization computing platform 110).

First device 150 and second device 160 may each be a personal computing device (e.g., desktop computer, laptop computer) or mobile computing device (e.g., smartphone, tablet, wearable device). In addition, first device 150 and/or second device 160 may be linked to and/or used by a specific user (who may, e.g., a customer of a financial institution or other organization operating event authorization computing platform 110). Also, for example, a user associated with first device 150 may use first device 150 to perform financial transactions, banking functions, and/or electronically process secure and/or highly sensitive documents such as, for example, checks, personal wills, mortgage documents, and insurance documents.

Computing environment 100 also may include one or more networks, which may interconnect one or more of event authorization computing platform 110, enterprise computing infrastructure 120, enterprise data storage platform 130, and enterprise user computing device 140. For example, computing environment 100 may include private network 170 (which may, e.g., interconnect event authorization computing platform 110, enterprise computing infrastructure 120, enterprise data storage platform 130, and enterprise user computing device 140, and/or one or more other systems which may be associated with an organization, such as a financial institution) and public network 180 (which may, e.g., interconnect first device 150 and second device 160 with private network 170 and/or one or more other systems, public networks, sub-networks, and/or the like). Public network 180 may be a high generation cellular network, such as, for example, a 5G or higher cellular network. In some embodiments, computing environment 100 also may include local network 190 (which may, e.g., interconnect first device 150 and second device 160 with each other). Local network 190 may be configured to send and receive messages via different protocols, e.g. Bluetooth, Wireless Fidelity ("Wi-Fi"), near field communication ("NFC"), Infrared, cellular, and/or other protocols that enable device to device communication over short distances. In some embodiments, local network 190 may be connected to public network 180.

In one or more arrangements, enterprise computing infrastructure 120, enterprise data storage platform 130, and enterprise user computing device 140, first device 150, second device 160, and/or the other systems included in computing environment 100 may be any type of computing device capable of receiving a user interface, receiving input via the user interface, and communicating the received input to one or more other computing devices. For example, enterprise computing infrastructure 120, enterprise data storage platform 130, and enterprise user computing device 140, first device 150, second device 160, and/or the other systems included in computing environment 100 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of event authorization computing platform 110, enterprise computing infrastructure 120, enterprise data storage platform 130, and enterprise user computing device 140, first device 150, second device 160 may, in some instances, be special-purpose computing devices configured to perform specific functions.

Referring to FIG. 1B, event authorization computing platform 110 may include one or more processors 111, memory 112, and communication interface 113. A data bus may interconnect processor 111, memory 112, and communication interface 113. Communication interface 113 may be a network interface configured to support communication between event authorization computing platform 110 and one or more networks (e.g., network 170, network 180, network 190, or the like). Memory 112 may include one or more program modules having instructions that when executed by processor 111 cause event authorization computing platform 110 to perform one or more functions described herein and/or one or more databases that may store and/or otherwise maintain information which may be used by such program modules and/or processor 111. In some instances, the one or more program modules and/or databases may be stored by and/or maintained in different memory units of event authorization computing platform 110 and/or by different computing devices that may form and/or otherwise make up event authorization computing platform 110. For example, memory 112 may have, store, and/or include device detection engine 112a, authentication engine 112b, and event authorization module 112c. Device detection engine 112a may build and/or update one or more device databases, build and/or update one or more device movement patterns, build and/or update one or more device proximity maps, and/or build and/or update one or more other machine-learned models based on captured and/or received location data. Authentication engine 112b may have instructions to utilize information provided by device detection engine 112a, and may have instructions that direct and/or cause event authorization computing platform 110 to authorize an event by utilizing a high generation cellular network to authenticate a device associated with the event. For example, authentication engine 112b may have instructions to prompt devices to authenticate other proximate devices, and/or to process authentication tokens received in response to the prompt, as discussed in greater detail below. Event authorization module 112c may have instructions to confirm or deny requests to authorize an event, and/or cause timestamps, digital witnesses, and so forth to be applied to documents associated with the event.

Figure 2A:
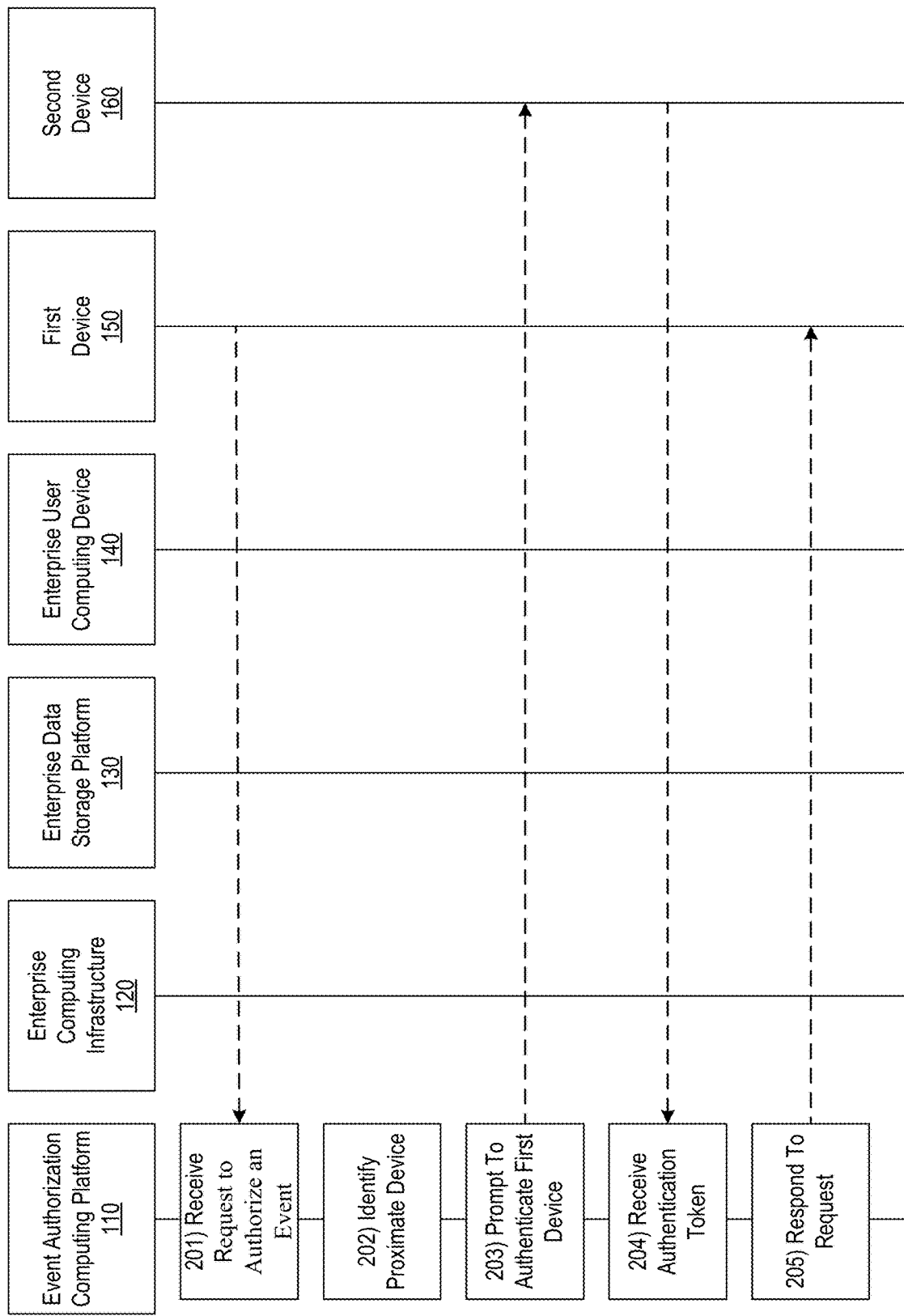

FIGS. 2A-2G depict an illustrative event sequence for authorizing an event by utilizing a high generation cellular network to authenticate a device associated with the event in accordance with one or more example embodiments. Referring to FIG. 2A, at step 201, event authorization computing platform 110 may receive, from a first device, a request to authorize an event. For example, at step 201, event authorization computing platform 110 may receive, via the communication interface (e.g., communication interface 113), from a first device (e.g., a first device 150), a request to authorize an event. The request to authorize an event received by event authorization computing platform 110 from first device 150 may, for instance, be and/or include a request to authorize a withdrawal, deposit, and/or transfer of funds. In some instances, the request to authorize an event received by event authorization computing platform 110 from first device 150 may, for instance, be and/or include mortgage application data received by a financial institution from a loan applicant. In some instances, the request to authorize an event received by event authorization computing platform 110 from first device 150 may, for instance, be and/or include a will and/or last testament that needs to be signed and witnessed. In some instances, the request to authorize an event received by event authorization computing platform 110 from first device 150 may, for instance, be and/or include a financial transaction related to a purchase (e.g., down payment for a home or an auto).

At step 202, event authorization computing platform 110 may identify, based on an analysis of location data, that a second device is proximate to the first device. Location data may be retrieved from a variety of sources, such as, for example, from a satellite-based navigation system such as a global positioning system ("GPS"), known locations of cellular towers, and Wireless Fidelity ("Wi-Fi") networks. In some embodiments, at step 202, event authorization computing platform 110 may utilize a high generation cellular network (e.g., public network 180) to retrieve location data for one or more devices. Event authorization computing platform 110 may analyze the location data to determine distances of the devices from the first device (e.g., first device 150), and identify that a particular device (e.g., second device 160) is proximate to the first device (e.g., first device 150). For example, event authorization computing platform 110 may apply distance measurement techniques to determine distances between devices (e.g., triangulation techniques to locate nodes within a network), and identify that a particular device (e.g., second device 160) is proximate to the first device (e.g., first device 150).

In some embodiments, event authorization computing platform 110 may update a device movement pattern corresponding to one or more devices, and store such pattern in an enterprise data storage platform (e.g., enterprise data storage platform 130). For instance, event authorization computing platform 110 may update, based on location data, a movement pattern corresponding to the first device (e.g., first device 150) to indicate movement of the first device (e.g., first device 150) within an operating environment. For example, event authorization computing platform 110 may monitor progress of the first device (e.g., first device 150) within a queue while a user associated with the first device (e.g., first device 150) waits for services to be rendered. For example, event authorization computing platform 110 may detect when the first device (e.g., first device 150) leaves the queue and proceeds to a point of sales location.

Also, for example, event authorization computing platform 110 may update, based on location data, a movement pattern corresponding to a second device (e.g., second device 160) to indicate movement of the second device (e.g., second device 160) within an operating environment. For instance, event authorization computing platform 110 may detect the arrival of the second device (e.g., second device 160) within an operating environment, and may detect that the second device (e.g., second device 160) has joined the same queue as the first device (e.g., first device 150). As devices move through the computing environment, the movement patterns may, for instance, map where the devices have been and where they is going; in addition, event authorization computing platform 110 may record the device movement patterns, and store the patterns in the enterprise data storage platform (e.g., enterprise data storage platform 130). Thus, event authorization computing platform 110 may map the movement of devices, as well as relative distances between devices as they move through the computing environment, which may enable event authorization computing platform 110 to identify future devices that may be prompted for authentication of one or more devices in the operating environment.

In some embodiments, identifying the second device (e.g., second device 160) may include accessing a repository (e.g., enterprise data storage platform 130) of trusted devices, and confirming that the second device (e.g., second device 160) is in the repository (e.g., enterprise data storage platform 130) of trusted devices. For example, the enterprise data storage platform (e.g., enterprise data storage platform 130) may maintain and/or update a list of trusted devices associated with users of enterprise computing infrastructure 120. For example, one or more devices that are proximate to the first device (e.g., first device 150) may be devices that are recognizable by enterprise computing infrastructure 120. For example, device information related to one or more devices that are authorized to interact with enterprise computing infrastructure 120 may be stored in the enterprise data storage platform (e.g., enterprise data storage platform 130). For example, device information related to one or more devices that have an authorized enterprise mobile application installed and/or that have been authenticated by a respective user to access user related information in enterprise computing infrastructure 120 may be labeled as trusted devices and enterprise computing infrastructure 120 may associate these devices as trusted devices associated with the user, and store such an association in the enterprise data storage platform (e.g., enterprise data storage platform 130). Subsequently, in identifying the second device (e.g., second device 160), event authorization computing platform 110 may access the enterprise data storage platform (e.g., enterprise data storage platform 130) to confirm that the second device (e.g., second device 160) is in the repository (e.g., enterprise data storage platform 130) of trusted devices. As described herein, event authorization computing platform 110 may update, based on location data, movement patterns corresponding to such trusted devices, and store the patterns in the enterprise data storage platform (e.g., enterprise data storage platform 130).

In some embodiments, the second device (e.g., second device 160) may be associated with the first device (e.g., first device 150) requesting authorization for the event. For example, one or more devices associated with the first device (e.g., first device 150) may interact with enterprise computing infrastructure 120 at different times. For example, enterprise computing infrastructure 120 may detect that one or more devices associated with the first device (e.g., first device 150) have authorized access to an enterprise mobile application associated with enterprise computing infrastructure 120. For example, enterprise computing infrastructure 120 may detect that a user has authorized a smartphone and a wearable device to access the user's account information via enterprise mobile applications running on these devices. Accordingly, enterprise computing infrastructure 120 may associate these devices as trusted devices associated with the first device (e.g., first device 150), and store such an association in the enterprise data storage platform (e.g., enterprise data storage platform 130). Subsequently, in identifying the second device (e.g., second device 160), event authorization computing platform 110 may access the enterprise data storage platform (e.g., enterprise data storage platform 130) to confirm that the second device (e.g., second device 160) is in the repository (e.g., enterprise data storage platform 130) of trusted devices. As described herein, event authorization computing platform 110 may update, based on location data, movement patterns corresponding to such associated devices, and store the patterns in the enterprise data storage platform (e.g., enterprise data storage platform 130). For example, based on an analysis of location data (e.g., coordinates from global positioning systems), event authorization computing platform 110 may determine that the first device (e.g., first device 150) is at an operating environment, and a wearable device associated with the first device (e.g., first device 150) is at a location that is different from the location of the operating environment.

At step 203, event authorization computing platform 110 may prompt the second device to authenticate the first device. For example, at step 203, event authorization computing platform 110 may send an authentication token to the second device (e.g., second device 160). In some embodiments, event authorization computing platform 110 may present one or more interfaces to the second device (e.g., second device 160) and send queries, to the second device (e.g., second device 160), related to the first device (e.g., first device 150) and/or an entity in control of the first device (e.g., first device 150). Event authorization computing platform 110 may prompt the second device (e.g., second device 160) to provide responses to the queries.

At step 204, event authorization computing platform 110 may receive, from the second device, an authentication token indicating whether the first device is authenticated. For example, at step 204, event authorization computing platform 110 may receive, from the second device (e.g., second device 160) via the communication interface (e.g., communication interface 113), an authentication token indicating whether the first device (e.g., first device 150) is authenticated. For example, the second device (e.g., second device 160) may provide responses to the queries, related to the first device (e.g., first device 150), that are provided by event authorization computing platform 110.

In some embodiments, subsequent to receiving the authentication token from second device, event authorization computing platform 110 may identify that a third device is proximate to the first device and to the second device. For example, based on the analysis of the location data, event authorization computing platform 110 may identify that a third device is proximate to the first device (e.g., first device 150) and the second device (e.g., second device 160). In some embodiments, in identifying the third device, event authorization computing platform 110 may access the enterprise data storage platform (e.g., enterprise data storage platform 130) to confirm that the third device is in the repository (e.g., enterprise data storage platform 130) of trusted devices. Event authorization computing platform 110 may prompt the third device to authenticate the second device (e.g., second device 160), and receive, from the third device, a second authentication token indicating whether the second device (e.g., second device 160) is authenticated. Subsequently, event authorization computing platform 110 may respond, based on the second authentication token, to the request to authorize the event. In some embodiments, one or more devices proximate to the first device (e.g., first device 150) may be sequentially linked via successive authentications to determine if the first device (e.g., first device 150) may be properly authenticated.

At step 205, event authorization computing platform 110 may respond, based on the authentication token, to the request to authorize the event. For example, at step 205, event authorization computing platform 110 may receive, from the second device (e.g., second device 160) via the communication interface (e.g., communication interface 113), an authentication token indicating that the first device (e.g., first device 150) is authenticated. Accordingly, event authorization computing platform 110 may respond to the request to authorize the event by approving the request.

Also, for example, at step 205, event authorization computing platform 110 may receive, from the second device (e.g., second device 160) via the communication interface (e.g., communication interface 113), an authentication token indicating that the first device (e.g., first device 150) is not authenticated. Accordingly, event authorization computing platform 110 may respond to the request to authorize the event by denying the request.

In some embodiments, event authorization computing platform 110 may detect, in response to the failure to authenticate the first device, unauthorized activity involving the first device. For example, if one or more devices proximate to the first device (e.g., first device 150) fail to authenticate the first device (e.g., first device 150), then event authorization computing platform 110 may detect unauthorized activity involving the first device. As described herein, event authorization computing platform 110 may generate one or more alert messages comprising alert information associated with the unauthorized activity involving the first device (e.g., first device 150). Event authorization computing platform 110 may send one or more alert messages to the first device (e.g., first device 150) and/or one or more trusted devices associated with the first device (e.g., first device 150). For example, event authorization computing platform 110 may send, via the communication interface (e.g., communication interface 113), to the first device (e.g., first device 150) and/or one or more trusted devices associated with the first device (e.g., first device 150), at least one alert message of the one or more alert messages. Event authorization computing platform 110 may send one or more alert messages to the enterprise user computing device (e.g., enterprise user computing device 140) associated with the event. For example, event authorization computing platform 110 may send, via the communication interface (e.g., communication interface 113), to the enterprise user computing device (e.g., enterprise user computing device 140), at least one alert message of the one or more alert messages, to prevent the enterprise user computing device (e.g., enterprise user computing device 140) from completing the unauthorized event requested by the first device (e.g., first device 150).

In some embodiments, event authorization computing platform 110 may not receive an authentication token from the second device (e.g., second device 160) within a time threshold. For example, the second device (e.g., second device 160) may ignore the prompt to authenticate the first device (e.g., first device 150). Also, for example, the second device (e.g., second device 160) may be temporarily unavailable to provide a response to the prompt to authenticate the first device (e.g., first device 150). Subsequently, event authorization computing platform 110 may identify that a third device is proximate to the first device. For example, based on the analysis of the location data, event authorization computing platform 110 may identify that a third device is proximate to the first device (e.g., first device 150). In some embodiments, in identifying the third device, event authorization computing platform 110 may access the enterprise data storage platform (e.g., enterprise data storage platform 130) to confirm that the third device is in the repository (e.g., enterprise data storage platform 130) of trusted devices. Event authorization computing platform 110 may prompt the third device to authenticate first device 150, and receive, from the third device, a second authentication token indicating whether the first device is authenticated. Subsequently, event authorization computing platform 110 may respond, based on the second authentication token, to the request to authorize the event.

In some embodiments, event authorization computing platform 110 may send the response to the first device (e.g., first device 150). For example, event authorization computing platform 110 may send a message to the first device (e.g., first device 150) indicating the response, and the message may be displayed via a user interface on the first device (e.g., first device 150). In some embodiments, event authorization computing platform 110 may cause an application to be activated on the first device (e.g., first device 150), thereby indicating approval of the request to authorize the event. In some embodiments, event authorization computing platform 110 may deny the first device (e.g., first device 150) access to one or more resources of the enterprise computing infrastructure (e.g., enterprise computing infrastructure 120), thereby indicating denial of the request to authorize the event.

In some embodiments, event authorization computing platform 110 may send the response to the enterprise user computing device (e.g., enterprise user computing device 140). For example, event authorization computing platform 110 may send a message to the enterprise user computing device (e.g., enterprise user computing device 140) indicating the response. Also, for example, event authorization computing platform 110 may send the response to the first device (e.g., first device 150) and to the enterprise user computing device (e.g., enterprise user computing device 140).

Enhanced privacy and security may be a priority for interactions with the enterprise computing infrastructure (e.g., enterprise computing infrastructure 120). Accordingly, in some embodiments, multipath propagation capabilities of radio signals, such as multi-input and multi-output ("MIMO") capabilities of higher generation wireless networks may be leveraged to enhance privacy and security. For example, after receiving, from the first device (e.g., first device 150), the request to authorize the event, event authorization computing platform 110 may establish, with the first device (e.g., first device 150), a first communication channel. Subsequently, after identifying that the second device (e.g., second device 160) is proximate to the first device (e.g., first device 150), event authorization computing platform 110 may establish, with the second device (e.g., second device 160), a second communication channel different from the first communication channel. Integrity of the authentications may be enhanced by prompting the second device (e.g., second device 160) to authenticate the first device (e.g., first device 150) via the second communication channel, and responding to the request to authorize the event via the first communication channel. In some embodiments, the first device (e.g., first device 150) and the second device (e.g., second device 160) may communicate via a third communication channel, such as over local network 190 (e.g., Bluetooth connectivity, Wi-Fi connectivity, NFC connectivity, and so forth), thereby adding another layer of confidence and security to the authentication process. In some embodiments, device-to-device communication may be established with or without active participation from users of the respective devices. In some embodiments, event authorization computing platform 110 may cause the entire authentication process to be executed in the background via automatic exchange of data between relevant devices and servers. Maintaining distinct and simultaneous communication channels with separate devices may enhance security, increase data transmission rates, and enhance integrity of the authentication process.

Figure 2B:
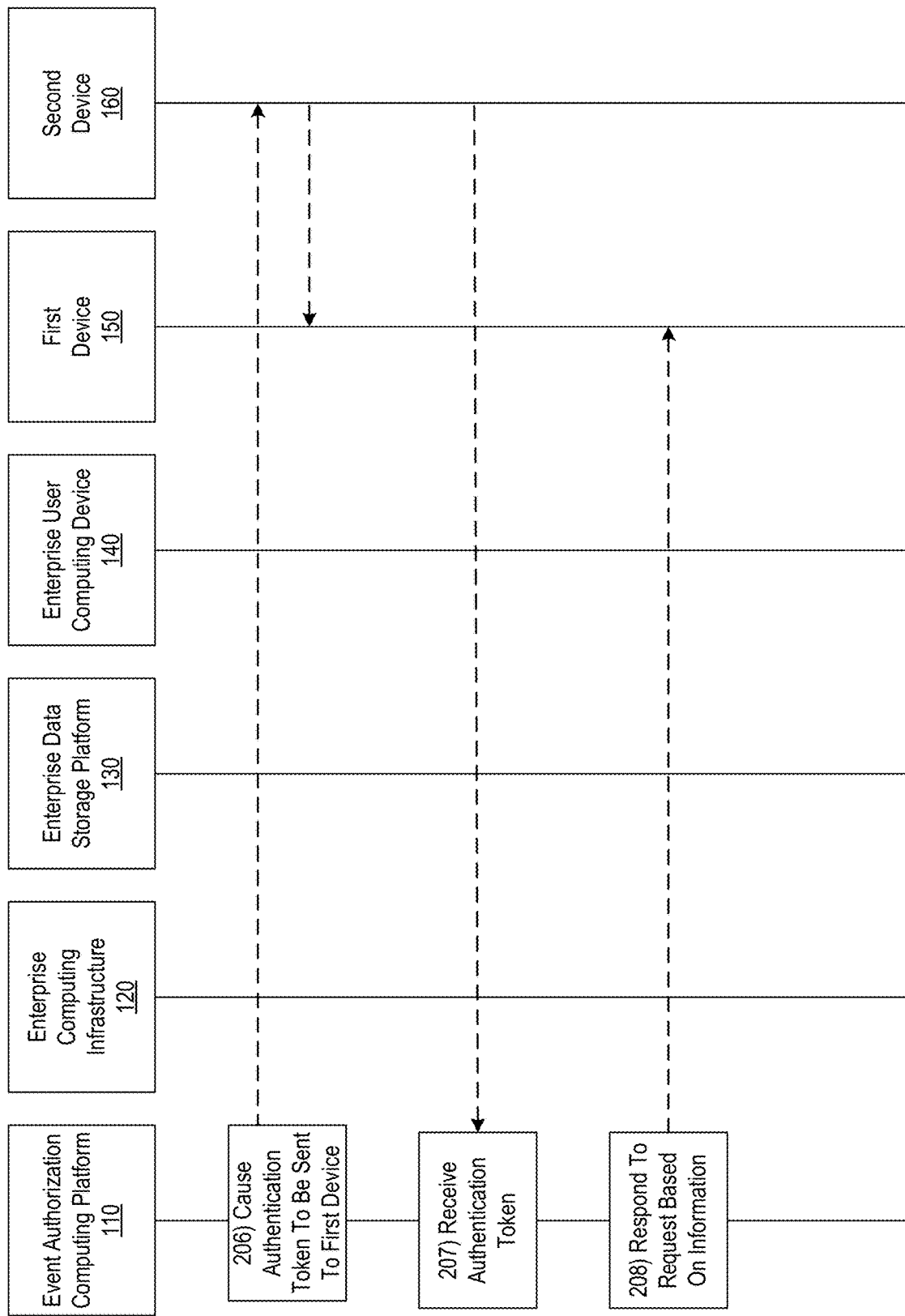

Referring to FIG. 2B, at step 206, event authorization computing platform 110 may cause the second device to send, via a local network, the authentication token to the first device. For example, event authorization computing platform 110 may send the authentication token to the second device (e.g., second device 160) via a public network (e.g., public network 180), and cause the second device (e.g., second device 160) to transmit the authentication token to the first device (e.g., first device 150) via the local network (e.g., local network 190). Generally, event authorization computing platform 110 may identify (e.g., via enterprise mobile applications configured to be in communication with event authorization computing platform 110), that one or more devices are proximate to the first device (e.g., first device 150) within a local network (e.g., local network 190). For example, the second device (e.g., second device 160) may be within range for a device-to-device communication (e.g., second device 160 is within a Bluetooth range of first device 150). In some embodiments, the devices may communicate via device-to-device communication to provide a secondary authentication or affirmation process. For example, event authorization computing platform 110 may cause the second device (e.g., second device 160) to transmit the authentication token to the first device (e.g., first device 150) via the device-to-device communication (e.g., Bluetooth).

In some embodiments, causing the second device to send, via the local network, the authentication token to the first device may be performed via an interface on the second device. For example, event authorization computing platform 110 may send the authentication token to the second device (e.g., second device 160) via an interface on the second device (e.g., second device 160), and prompt, via the interface, a user associated with the second device (e.g., second device 160) to send the authentication token to the first device (e.g., first device 150). For example, event authorization computing platform 110 may send one or more queries to the second device (e.g., second device 160) via an interface on the second device (e.g., second device 160), and prompt a user associated with the second device (e.g., second device 160) to send responses to the queries to the first device (e.g., first device 150).

In some embodiments, causing the second device to send, via the local network, the authentication token to the first device may be performed via background applications that are configured to run on the respective devices. For example, event authorization computing platform 110 may provide, to a proximate second device 160, an authentication token, and cause second device 160 to transmit (e.g., via local network 190) the authentication token to first device 150. Subsequently, event authorization computing platform 110 may cause first device 150 to transmit (e.g., via public network 180) the authentication token to event authorization computing platform 110. Upon receipt of the authentication token, event authorization computing platform 110 may authenticate first device 150, and approve the request to authorize the event. Such a supplemental authentication provides an additional level of security to the authorization process.

For example, the first device (e.g., first device 150) and the second device (e.g., second device 160) may be configured to run enterprise mobile applications that are authorized to communicate with enterprise computing infrastructure 120. When the first device (e.g., first device 150) and the second device (e.g., second device 160) are identified to be in a shared local network (e.g., local network 190) within an operating environment (e.g., premises of a financial institution, point of sales at an auto dealership), event authorization computing platform 110 may automatically establish a communication channel between the first device (e.g., first device 150) and the second device (e.g., second device 160) via the shared local network (e.g., local network 190) to enable device-to-device communication (e.g., between the enterprise mobile applications that are configured to run on first device 150 and on second device 160). Accordingly, event authorization computing platform 110 may send the authentication token to second device 160 via the public network (e.g., public network 180), and cause the second device (e.g., second device 160) to transmit the authentication token to the first device (e.g., first device 150) via device-to-device communication (e.g., between the enterprise mobile applications that are configured to run on first device 150 and second device 160) over the established communication channel between the first device (e.g., first device 150) and the second device (e.g., second device 160) via the shared local network (e.g., local network 190).

In some embodiments, event authorization computing platform 110 may assess a risk level of an event in determining an appropriate authentication process. For example, a risk level of an event may be indicative of a severity of consequences (e.g., to a financial institution, a user, and so forth) of an error in authorizing an event. For example, an event that involves a relatively small exchange of monetary value (e.g., a few hundreds of currency units) may be associated with a low risk level. Also, for example, an event that involves a relatively high exchange of monetary value (e.g., thousands or millions of currency units) may be associated with a high risk level. In some examples, a risk level of an event may be based on the type of event. For example, withdrawing a large amount of money from the bank may be associated with a high risk level. Also, for example, executing loan documents to purchase a car, and/or executing mortgage documents for a property transaction may be associated with a high risk level. In some embodiments, a risk level associated with an event may be based on a threshold value set by the user associated with first device 150 that is requesting the authorization. For example, such user may have set a limit of credit card purchases at $250. Accordingly, an event associated with transactions less than $250 may be associated with a low risk level, whereas an event associated with transactions greater than $250 may be associated with a high risk level.

Event authorization computing platform 110 may determine an appropriate authentication process based on an assessment of a risk level of an event. For example, for an event associated with a low risk level, event authorization computing platform 110 may determine to automatically approve the request to authorize the event. Also, for example, for an event associated with a low risk level, event authorization computing platform 110 may prompt a proximate second device 160 to authenticate first device 150. As another example, for an event associated with a high risk level, event authorization computing platform 110 may prompt a plurality of proximate devices to authenticate first device 150. Also, for example, for an event associated with a high risk level, event authorization computing platform 110 may determine that a supplemental authentication via device-to-device communication over a local network (e.g., local network 190) may be required.

For example, a user associated with first device 150 may be at a vehicle dealership and may request authorization for a high value transaction on a credit card to pay for a down payment for purchase of the vehicle. Upon initiating use of the credit card to perform the transaction, a request to authorize the event (e.g., credit card transaction) may be sent to event authorization computing platform 110. In some instances, event authorization computing platform 110 may determine, based on location data, that the user is located at a particular car dealership. Event authorization computing platform 110 may determine, based on the request, that the event is associated with a high risk level. Accordingly, event authorization computing platform 110 may identify one or more devices (e.g., mobile devices running an enterprise host application) at the particular car dealership. Such identification may be based on location data retrieved, for example, from a 5G network. Event authorization computing platform 110 may send, via the 5G network, an authentication token to the identified one or more devices. In some embodiments, the identified one or more devices may include a user computing device associated with a salesperson at the dealership. Event authorization computing platform 110 may cause the authentication token to be sent from a device of the identified one or more devices (e.g. user computing device associated with the salesperson at the dealership) to first device 150 via device-device communication (e.g., over local network 190). Event authorization computing platform 110 may cause the authentication token to be sent from first device 150 to event authorization computing platform 110. Accordingly, event authorization computing platform 110 is able to confirm that first device 150 is at the vehicle dealership, and approves the request to authorize the event. In instances where first device 150 is not located at the vehicle dealership, the device-to-device communication would fail, thereby indicating potential unauthorized activity, and event authorization computing platform 110 is able to deny the request to authorize the event.

In some embodiments, the identified one or more devices may include a trusted device (e.g., a wearable device) associated with the user associated with first device 150. Event authorization computing platform 110 may cause the authentication token to be sent from the trusted device associated with the user associated with first device 150 to first device 150 via device-device communication (e.g., over local network 190). In instances where the trusted device is unable to send the authentication token to first device 150 (e.g., the trusted device is not proximate to first device 150), event authorization computing platform 110 may detect potential unauthorized activity. In such instances, event authorization computing platform 110 is able to deny the request to authorize the event. In some instances, device-device communication may fail for proximate devices (e.g., lack of local connectivity, Bluetooth feature being non-operational on a device, and so forth), and alternate methods may be used to authenticate and approve the request for the event.

At step 207, event authorization computing platform 110 may receive the authentication token from the first device. For example, at step 207, the first device (e.g., first device 150), upon receiving the authentication token from the second device (e.g., second device 160), may then transmit the authentication token to event authorization computing platform 110. In some embodiments, in receiving the authentication token from the first device (e.g., first device 150), event authorization computing platform 110 may cause the first device (e.g., first device 150) to send the authentication token. For example, event authorization computing platform 110 may enable a user associated with the first device (e.g., first device 150) to interact with event authorization computing platform 110 via an interface provided on the first device (e.g., first device 150). In some embodiments, in receiving the authentication token from the first device (e.g., first device 150), event authorization computing platform 110 may cause the first device (e.g., first device 150) to automatically send the authentication token via background applications on the first device (e.g., first device 150). For example, event authorization computing platform 110 may automatically perform one or more steps via background applications on the first device (e.g., first device 150) and cause the authentication token to be transmitted.

At step 208, event authorization computing platform 110 may then respond, based on the authentication token, to the request to authorize the event. This may be achieved in the manner described with respect to FIG. 2A at step 205.

As described at steps 206-208, event authorization computing platform 110 may affirm that the first device (e.g., first device 150) and the second device (e.g., second device 160) are proximate to each other in an operating environment. Accordingly, this may confirm device locations based on an analysis of location data from the public network (e.g., public network 180) and authenticate the devices for further interactions with the enterprise computing infrastructure (e.g., enterprise computing infrastructure 120). For example, based on data from 5G cellular networks and/or GPS coordinates, event authorization computing platform 110 may detect presence of the first device (e.g., first device 150) and the second device (e.g., second device 160) in an operating environment. By performing steps 206-208, event authorization computing platform 110 may obtain further confirmation that the first device (e.g., first device 150) and the second device (e.g., second device 160) are in the operating environment, and are proximate to one another. This enhances security of the enterprise computing infrastructure (e.g., enterprise computing infrastructure 120), and helps identify unauthorized activity and/or duress in the operating environment, as further described herein.

Referring to FIG. 2C, at step 209, event authorization computing platform 110 may provide, to the second device, information related to the first device, and may prompt the second device to verify the information. For example, at step 209, event authorization computing platform 110 may update the device movement pattern corresponding to the first device (e.g., first device 150) based on an analysis of location data. Event authorization computing platform 110 may provide the location of the first device (e.g., first device 150) to the second device (e.g., second device 160), and prompt the second device (e.g., second device 160) to confirm the location. For example, event authorization computing platform 110 may initiate a dialog with the second device (e.g., second device 160) via an interface, and send a query to the second device (e.g., second device 160) to confirm that the first device (e.g., first device 150) has moved from the front of a queue to the cashier or point of sales location.

Also, for example, event authorization computing platform 110 may confirm entry to, and exit from, an operating environment by entities associated with devices. For example, an entity associated with the first device (e.g., first device 150) may enter the premises of a financial institution. Event authorization computing platform 110 may detect that the second device (e.g., second device 160) is already present within the premises of the financial institution. Based, for example on cameras, and/or based on known physical layout of the financial institution, event authorization computing platform 110 may determine that an entity associated with the second device (e.g., second device 160) has a clear line of sight of the entrance to the premises of the financial institution. Accordingly, event authorization computing platform 110 may prompt the entity associated with the second device (e.g., second device 160) to confirm that the entity associated with the first device (e.g., first device 150) has entered the premises of a financial institution.

As another example, event authorization computing platform 110 may send a photograph of an entity associated with the first device (e.g., first device 150) to the second device (e.g., second device 160) to authenticate the first device (e.g., first device 150). For example, event authorization computing platform 110 may access the enterprise data storage platform (e.g., enterprise data storage platform 130) to retrieve a photograph associated with an entity associated with the first device (e.g., first device 150), and provide the photograph to the second device (e.g., second device 160) for verification.

Figure 3:
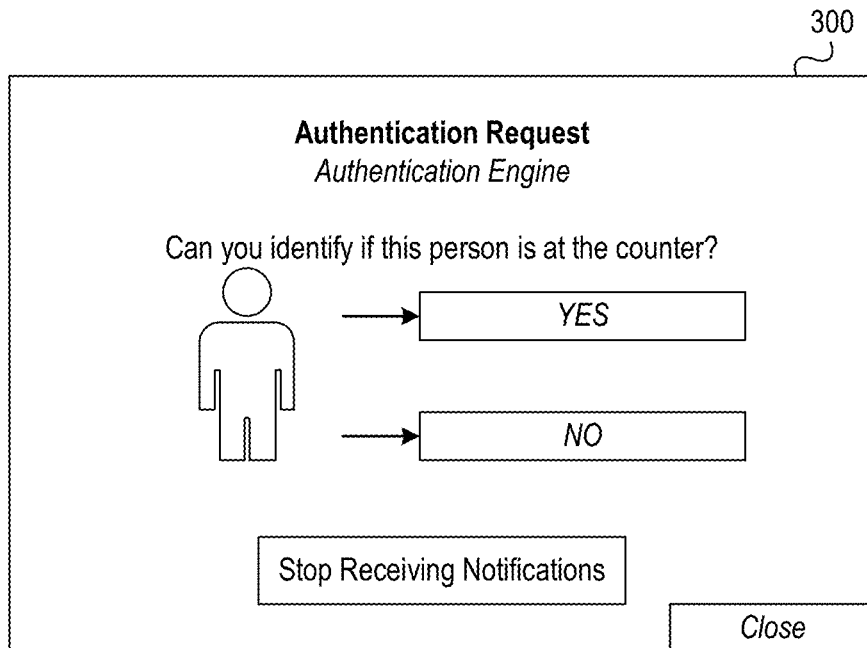
FIGS. 3 and 4 depict example graphical user interfaces for authorizing an event by utilizing a high generation cellular network to authenticate a device associated with the event in accordance with one or more example embodiments.

In some embodiments, event authorization computing platform 110 may access one or more cameras at the operating environment to retrieve a photograph of an entity associated with the first device (e.g., first device 150). For example, a user associated with the first device (e.g., first device 150) may be waiting at the head of a queue at a point of sales location. Event authorization computing platform 110 may access one or more cameras to retrieve a photograph of a user associated with the first device (e.g., first device 150), and send this photograph to the second device (e.g., second device 160) to authenticate the first device (e.g., first device 150). For example, event authorization computing platform 110 may cause the second device (e.g., second device 160) to display and/or otherwise present a graphical user interface similar to graphical user interface 300, which is depicted in FIG. 3. As seen in FIG. 3, graphical user interface 300 may include text and/or other information providing the photograph and prompting second device 160 to confirm that the entity in the photograph is at the location provided (e.g., "Can you identify if this person is at the counter?"). In some embodiments, event authorization computing platform 110 may utilize one or more image processing techniques to process images from surveillance cameras to identify physical movements, attire, personal features, or the like. In some embodiments, event authorization computing platform 110 may provide one or more such information to the second device (e.g., second device 160) and request confirmation of the information provided.

At step 210, event authorization computing platform 110 may receive, from the second device, an authentication token based on the information provided. For example, event authorization computing platform 110 may provide the location of the first device (e.g., first device 150) to the second device (e.g., second device 160), and prompt the second device (e.g., second device 160) to confirm the location, and the second device (e.g., second device 160) may respond to confirm the location.

For example, event authorization computing platform 110 may receive a response from the second device (e.g., second device 160) via the graphical user interface similar to graphical user interface 300, which is depicted in FIG. 3. As seen in FIG. 3, graphical user interface 300 may include text and/or other information providing the photograph and prompting second device 160 to confirm that the entity in the photograph is at the location provided (e.g., "Can you identify if this person is at the counter?"). The second device (e.g., second device 160) may respond by selecting "Yes" to confirm that the entity in the photograph is at the location provided, or the second device (e.g., second device 160) may respond by selecting "No" to confirm that the entity in the photograph is at the location provided. As described herein, in some embodiments, the second device (e.g., second device 160) may fail to respond within a time threshold.

In some embodiments, event authorization computing platform 110 may access one or more cameras at the operating environment to retrieve a photograph of a portion of the operating environment that includes a location of the first device (e.g., first device 150). Event authorization computing platform 110 may provide this location to a user associated with the second device (e.g., second device 160), and prompt the user associated with the second device (e.g., second device 160) to direct a camera associated with the second device (e.g., second device 160) toward the location of the first device (e.g., first device 150). Event authorization computing platform 110 may cause the second device (e.g., second device 160) to capture and transmit a real time photograph of the location of the first device (e.g., first device 150). For example, event authorization computing platform 110 may issue a series of prompts to the user associated with the second device (e.g., second device 160) to capture and transmit the photograph of the location of the first device (e.g., first device 150). Also, for example, event authorization computing platform 110 may cause the second device (e.g., second device 160) to automatically capture and transmit the photograph of the location of the first device (e.g., first device 150) via a background application (e.g., an enterprise mobile application on the second device). In some embodiments, event authorization computing platform 110 may utilize one or more image processing techniques, and/or machine learned techniques to compare the image from the one or more cameras at the operating environment, and the image from the second device (e.g., second device 160) to confirm location and/or entities, and/or objects present in the operating environment. Such analysis may be combined with analysis of location data to authenticate one or more devices present in the operating environment.

At step 211, event authorization computing platform 110 may then respond, based on the authentication token, to the request to authorize the event. This may be achieved in the manner described with respect to FIG. 2A at step 205, and/or FIG. 2B at step 208.

In some embodiments, event authorization computing platform 110 may determine confidence levels for one or more devices. For example, one or more devices may be configured to run an enterprise mobile application to access resources in the enterprise computing infrastructure (e.g., enterprise computing infrastructure 120), and event authorization computing platform 110 may determine confidence levels, dynamically update such confidence levels, and store data in the enterprise data storage platform (e.g., enterprise data storage platform 130). The confidence levels may be determined based on several factors, including, but not limited to, history of interactions with the enterprise computing infrastructure (e.g., enterprise computing infrastructure 120), past authentications performed, historical responses to prompts to authenticate devices, ownership data for the device, biometric data associated with the device, reliability of one or more networks, and so forth. Additional and/or alternate factors may be utilized to determine confidence levels for the one or more devices.

Generally, confidence level of a device is indicative of a reliability of the device in the authentication process described herein. For example, authentication performed by a device with a high confidence level is more reliable than authentication performed by a device with a low confidence level. For example, event authorization computing platform 110 may determine that authentication performed by a device with a confidence level higher than a threshold may be relied upon without additional authentications. Also, for example, event authorization computing platform 110 may determine that authentication performed by a device with a confidence level lower than a threshold may be not be relied upon and may require additional authentications by other devices.

Figure 2D:
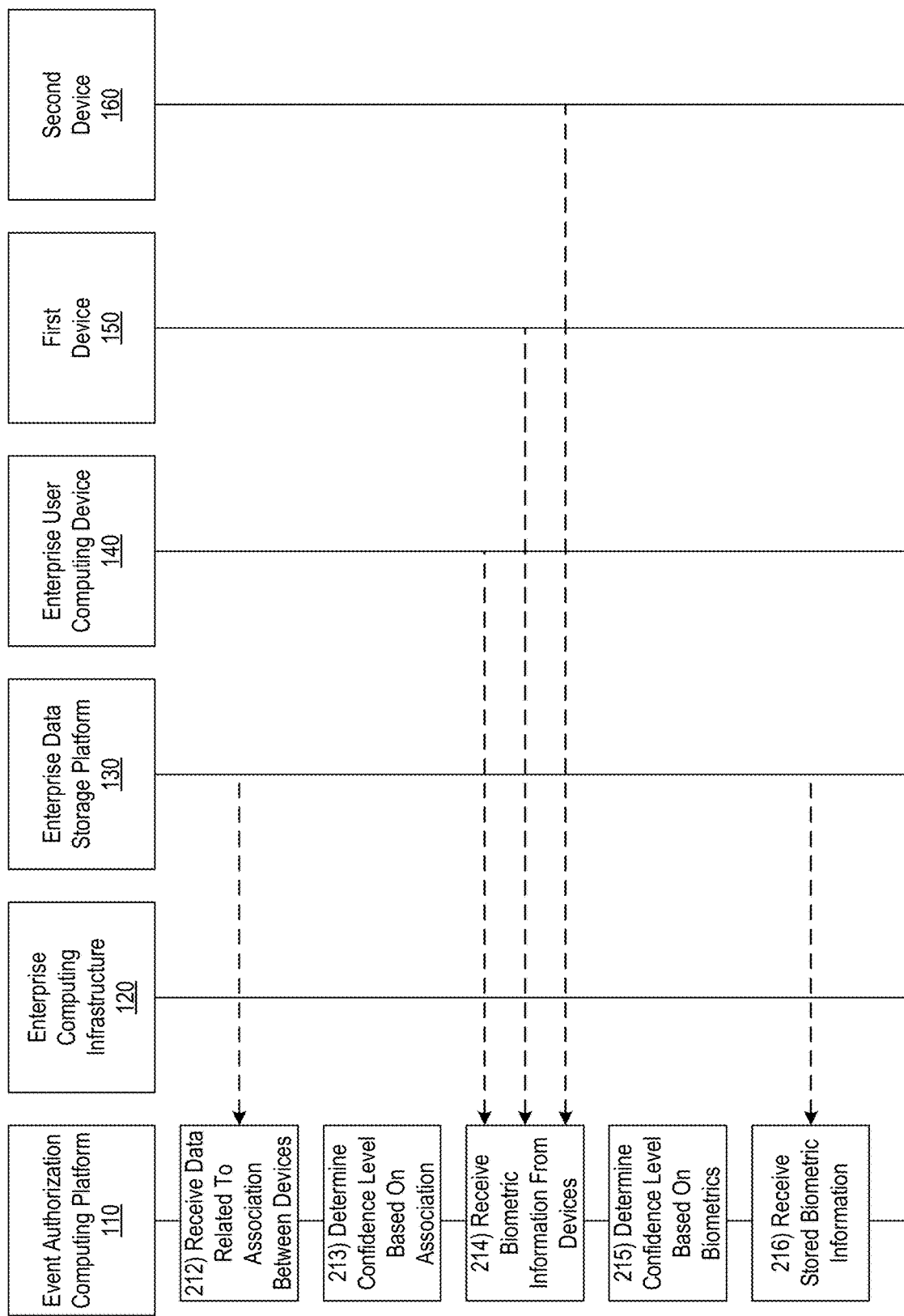

Referring to FIG. 2D, at step 212, event authorization computing platform 110 may identify an association, in a repository of user devices, between the first device and the second device. For example, enterprise computing infrastructure 120 may detect that one or more devices associated with the first device (e.g., first device 150) have authorized access to an enterprise mobile application associated with enterprise computing infrastructure 120. For example, enterprise computing infrastructure 120 may detect that a user has authorized a smartphone and a wearable device to access the user's account information via enterprise mobile applications running on these devices. Accordingly, enterprise computing infrastructure 120 may associate these devices as trusted devices associated with the first device (e.g., first device 150). Also, for example, enterprise computing infrastructure 120 may detect one or more devices associated with a family member of a user associated with first device, and may associate the one or more devices associated with the family member as trusted devices. At step 212, event authorization computing platform 110 may identify the association in the enterprise data storage platform (e.g., enterprise data storage platform 130).

At step 213, event authorization computing platform 110 may determine a confidence level based on the association. For example, based on such associations, event authorization computing platform 110 may associate a higher confidence level with the trusted devices associated with the first device (e.g., first device 150). Event authorization computing platform 110 may store associations in the enterprise data storage platform (e.g., enterprise data storage platform 130), and associate confidence levels with the stored associations between devices. Event authorization computing platform 110 may dynamically update associations and confidence levels based on interactions between devices, and interactions between devices and the enterprise computing infrastructure (e.g., enterprise computing infrastructure 120).

At step 214, event authorization computing platform 110 may retrieve biometric information from one or more devices. For example, event authorization computing platform 110 may retrieve fingerprint data, facial recognition data, retina scanning data, and/or voice recognition data associated with an authorized user associated with the first device (e.g., first device 150), and/or an authorized user associated with the second device (e.g., second device 160) while the devices are present in an operating environment. For example, event authorization computing platform 110 may prompt the second device (e.g., second device 160) to authenticate the first device (e.g., first device 150), and event authorization computing platform 110 may receive biometric information associated with a user associated with the second device (e.g., second device 160).

At step 215, event authorization computing platform 110 may determine the confidence level of the second device based on the biometric information. For example, event authorization computing platform 110 may determine a security level of the second device (e.g., second device 160) based on biometric information. In some instances, event authorization computing platform 110 may determine that the second device (e.g., second device 160) is highly secure, and event authorization computing platform 110 may associate a higher confidence level with the second device (e.g., second device 160). Also, for example, event authorization computing platform 110 may detect a high pulse rate for the user associated with the second device (e.g., second device 160), and may associate a lower confidence level with the second device (e.g., second device 160).

At step 216, event authorization computing platform 110 may retrieve biometric information associated with one or more devices from the enterprise data storage platform (e.g., enterprise data storage platform 130). For example, event authorization computing platform 110 may retrieve stored biometric information associated with the second device (e.g., second device 160) from the enterprise data storage platform (e.g., enterprise data storage platform 130).

Referring to FIG. 2E, at step 217, event authorization computing platform 110 may compare the received biometric information with known biometric information associated with the user associated with the second device. For example, event authorization computing platform 110 may compare a pulse rate data received from the second device (e.g., second device 160) with a stored pulse rate data associated with an authorized user associated with the second device (e.g., second device 160). Also, for example, event authorization computing platform 110 may compare blood pressure data, and/or blood sugar levels received from the second device (e.g., second device 160) with a stored blood pressure data, and/or blood sugar levels associated with an authorized user associated with the second device (e.g., second device 160).

At step 218, event authorization computing platform 110 may detect, based on the comparing, duress associated with the event. For example, at step 218, event authorization computing platform 110 may detect that the recently received biometric information is out of pattern for the second device (e.g., second device 160). For example, event authorization computing platform 110 may detect elevated blood pressure levels, and/or elevated blood sugar levels, and event authorization computing platform 110 may determine unusual circumstances in the operating environment. In some embodiments, event authorization computing platform 110 may receive and compare biometric information associated with one or more devices other than second device (e.g., enterprise user computing device 140, first device 150) to conclude duress (e.g., an active shooter, burglary in progress) in the operating environment. For example, an ongoing security incident in the operating environment may cause heightened levels of stress. Responses to the security incident may be manifested in changes in one or more biometric information associated with the one or more devices.

At step 219, event authorization computing platform 110 may, in response to detecting the duress, deny the request to authorize the event. For example, event authorization computing platform 110 may detect presence of unusual circumstances related to the event via biometric information from one or more devices (e.g., enterprise user computing device 140, first device 150, and/or second device 160). Based on detection of unusual circumstances related to the event, event authorization computing platform 110 may deny the request to authorize the event, and send a message to the first device (e.g., first device 150) denying the request to authorize the event.

Although duress may be detected automatically via biometric information, duress may also be detected via a dialog with one or more proximate devices. For example, event authorization computing platform 110 may need to confirm that the request, by first device 150, to authorize an event has not been made under duress. In prompting second device 160 to authenticate first device 150, event authorization computing platform 110 may cause the second device (e.g., second device 160) to display and/or otherwise present a graphical user interface, and include text and/or other information such as "Do you see any signs of stress?" or "Is the user clutching their heart?" or "Is the user under duress?" and so forth. By responding to the text and/or other information, user associated with second device 160 may make one or more affirmations that the operating environment and/or users in the operating environment are not under duress.

Referring to FIG. 2F, at step 220, event authorization computing platform 110 may receive a request to authorize an event, where the event is a signature to a document that requires a witness. In some instances, a user associated with the first device may be at a bank and may need a witness to complete a transaction. In some instances, the user may not have a witness accompanying them, and the bank employee may be unable to be a witness to the transaction. In such instances, a proximate user associated with a second device may be prompted to witness the transaction. In some instances, the proximate user associated with the second device may be prompted to complete one or more steps to witness the transaction. In some instances, the proximate second device may be prompted to complete one or more steps to witness the transaction, with or without assistance from a user associated with the second device. In such situations, location accuracy and proximity are key to a successful and secure authorization of the event. Accordingly, a fifth generation (or higher) cellular network may be particularly useful.

For example, user associated with first device 150 (e.g., first device 150) may be at a bank location to sign a document (e.g., a mortgage document) that requires a witness. For example, enterprise computing infrastructure 120 may provide the user associated with the first device (e.g., first device 150) one or more interfaces or a series of interfaces (e.g., via enterprise mobile application) to enable user associated with the first device (e.g., first device 150) to complete a transaction (e.g., a loan application). User associated with the first device (e.g., first device 150) may be ready to submit the application to enterprise computing infrastructure 120 for processing. In some instances, enterprise computing infrastructure 120 may prompt the user associated with the first device (e.g., first device 150) for a signature by a witness. In some instance, enterprise computing infrastructure 120 may provide user associated with the first device (e.g., first device 150) an option to add a digital witness to the event. Upon selection of this option, enterprise computing infrastructure 120 may send a notification to event authorization computing platform 110. Event authorization computing platform 110 may receive the notification, and identify one or more devices that are proximate to the first device (e.g., first device 150).

Figure 4:
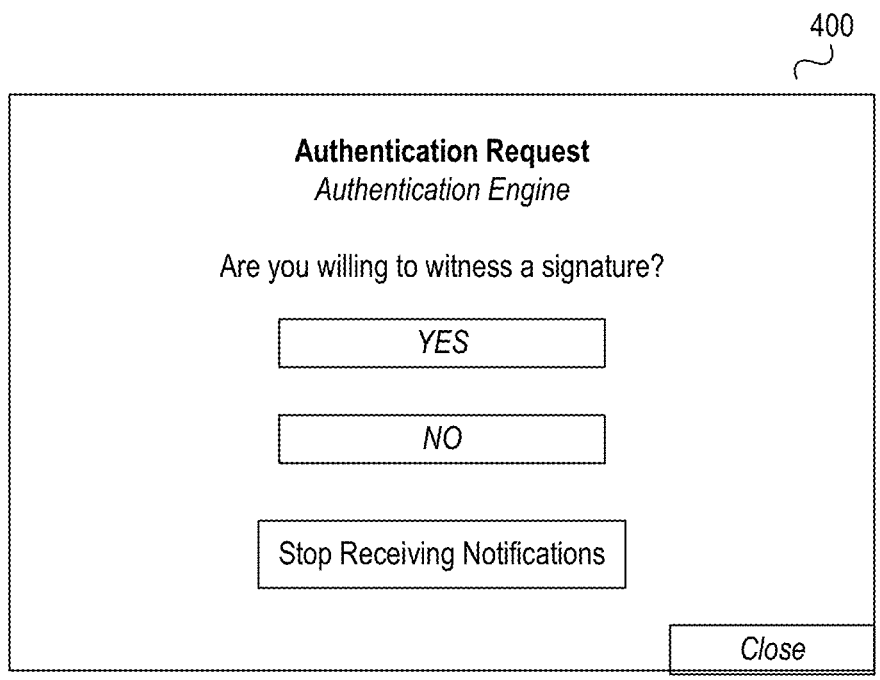

At step 221, event authorization computing platform 110 may prompt the one or more devices proximate to the first device (e.g., first device 150) to authenticate the first device. For example, employees of the bank may not be able to serve as witness to the signature. Also, for example, an entity requiring a witness to a signature may not have brought another entity to witness the signature. In some instances, a bank employee, may send out a request to witness the signature via the enterprise user computing device (e.g., enterprise user computing device 140). In some embodiments, event authorization computing platform 110 may identify that first device 150 is proximate to a particular enterprise user computing device (e.g., enterprise user computing device 140). Accordingly, event authorization computing platform 110 may prompt the enterprise user computing device (e.g., enterprise user computing device 140) to cause one or more devices proximate to first device 150, such as second device 160, to display and/or otherwise present a graphical user interface similar to graphical user interface 400, which is depicted in FIG. 4. As seen in FIG. 4, graphical user interface 400 may include text and/or other information prompting second device 160 to confirm its willingness to be a witness to the signature (e.g., "Are you willing to witness a signature?").

At step 222, event authorization computing platform 110 may receive, from the second device, an authentication token indicating that the signature has been witnessed. For example, event authorization computing platform 110 may receive a response from the second device (e.g., second device 160) via the graphical user interface similar to graphical user interface 400, which is depicted in FIG. 4. As seen in FIG. 4, graphical user interface 400 may include text and/or other prompting second device 160 to indicate its willingness to be a witness to the signature. The second device (e.g., second device 160) may respond by selecting "Yes" to confirm its willingness to witness the signature, or the second device (e.g., second device 160) may respond by selecting "No" to confirm its lack of willingness to witness the signature. As described herein, in some embodiments, the second device (e.g., second device 160) may fail to respond within a time threshold.

In some embodiments, upon confirmation of a willingness to witness the signature, event authorization computing platform 110 may send another authentication token to the second device (e.g., second device 160) and may request the second device (e.g., second device 160) to authenticate the first device (e.g., first device 150) using one or more techniques described herein. For example, event authorization computing platform 110 may provide additional information related to the first device (e.g., first device 150), such as a photograph and/or location of user associated with the first device (e.g., first device 150) to the second device (e.g., second device 160). For example, event authorization computing platform 110 may provide text and/or other information to second device 160 via a graphical user interface, such as, for example, "would you attest to the presence of a person in the bank today?" and event authorization computing platform 110 may provide a photograph of the relevant person. Second device 160 may affirm presence of the person by responding to the text and/or other information. For example, event authorization computing platform 110 may provide text and/or other information to second device 160 via a graphical user interface, such as, for example, "do you see someone sitting at a desk in front of you?" or "do you see who is sitting across at the corner of the room?" and event authorization computing platform 110 may provide a photograph of the relevant person or request a description of the relevant person. Second device 160 may affirm presence of the person by responding to the text and/or provide other pertinent information. Accordingly, the second device (e.g., second device 160) has witnessed and affirmed that the person was at the bank at a relevant time period, and a digital record of such activity may constitute a digital witness to the event. In some instances, user associated with the second device (e.g., second device 160) may be prompted to approach a bank employee associated with the enterprise user computing device (e.g., enterprise user computing device 140) to witness the signature by the user associated with the first device (e.g., first device 150).

In some embodiments, event authorization computing platform 110 may provide, to second device 160, a photograph of the relevant person and provide text and/or other information to second device 160 via a graphical user interface, such as, for example, "do you see this person in the room?". Upon receiving affirmation from the user associated with second device 160, event authorization computing platform 110 may prompt the user associated with second device 160 to direct an image capturing device associated with second device 160 toward the relevant person, capture an image of the person, and provide the captured image to event authorization computing platform 110. Upon receiving the captured image, event authorization computing platform 110 may perform image analysis to compare the captured image with an image in the enterprise data storage platform (e.g., enterprise data storage platform 130) to authenticate the transaction, and generate a timestamp and/or digital signature indicating that the transaction has been witnessed. A digital record of such activity may constitute a digital witness to the event.

In some embodiments, event authorization computing platform 110 may provide, to a proximate second device 160, an authentication token, and cause second device 160 to transmit (e.g., via local network 190) the authentication token to first device 150. Subsequently, event authorization computing platform 110 may cause first device 150 to transmit (e.g., via public network 180) the authentication token to event authorization computing platform 110. Upon receipt of the authentication token, event authorization computing platform 110 may authenticate the transaction, and use the authentication token as an indication that the transaction has been witnessed.

At step 223, event authorization computing platform 110 may approve, based on the second device (e.g., second device 160) being a witness, the signature to the document.

At step 224, event authorization computing platform 110 may add, based on the authentication token, a digital witness to the document associated with the event. For example, event authorization computing platform 110 may associate a digital timestamp indicating the time when the second device (e.g., second device 160) authenticated the first device (e.g., first device 150). In some embodiments, event authorization computing platform 110 may prompt the second device (e.g., second device 160) to add data related to the authentication process as a digital witness to the event and/or to the signature by user associated with the first device (e.g., first device 150), and event authorization computing platform 110 may add the digital witness from the second device (e.g., second device 160) to the document bearing the signature of a user associated with the first device (e.g., first device 150). For example, data associated with passage of an authentication token may be recorded and made part of the authentication token. For example, each device in the path of the authentication token may add an Internet Protocol ("IP") address, location data, time of receipt, and so forth. Such a digital record may constitute a digital witness to the event.

In some instances, a user may be associated with identifiers that may be added to a digital record that constitutes a digital witness. For example, upon completion of the authentication process, event authorization computing platform 110 may retrieve user's digital fingerprint from the enterprise data storage platform (e.g., enterprise data storage platform 130) and add that to the document bearing the signature of a user associated with the first device (e.g., first device 150) as digital witness to the event. In some embodiments, a user may be associated with one or more unique identifiers (e.g., a secure numeric code, a password, an encrypted form of user's personal information such as name, social security number, a biometric identifier, and so forth) that may be used as a digital witness to the event.

Referring to FIG. 2G, at step 225, event authorization computing platform 110 may receive location data for an other device. For example, event authorization computing platform 110 may receive location data (e.g., coordinates from global positioning systems), for the first device (e.g., first device 150) and a trusted device associated with the first device (e.g., first device 150).

At step 226, event authorization computing platform 110 may determine that the other device is not proximate to the first device. For example, based on an analysis of location data (e.g., coordinates from global positioning systems), and based on device association information retrieved from the enterprise data storage platform (e.g., enterprise data storage platform 130), event authorization computing platform 110 may determine that the first device (e.g., first device 150) is at an operating environment, and a wearable device associated with the first device (e.g., first device 150) is at a location that is different from the location of the operating environment.

At step 227, event authorization computing platform 110 may detect unauthorized activity involving the first device. For example, user associated with the first device (e.g., first device 150) may have indicated a preference that a trusted device (e.g., a wearable device) associated with the first device (e.g., first device 150) be used to authenticate the first device (e.g., first device 150). Upon detecting that the wearable device is not proximate to the first device (e.g., first device 150), event authorization computing platform 110 may detect unauthorized activity involving the first device (e.g., first device 150).

At step 228, event authorization computing platform 110 may deny the request to the request to authorize the event, based on detection of unauthorized activity involving the first device (e.g., first device 150).

At step 229, event authorization computing platform 110 may generate one or more alert messages. For example, at step 229, in response to detecting unauthorized activity involving the first device (e.g., first device 150), event authorization computing platform 110 may generate one or more alert messages comprising alert information associated with the unauthorized activity involving the first device (e.g., first device 150). Event authorization computing platform 110 may send one or more alert messages to the first device (e.g., first device 150) and/or one or more trusted devices associated with the first device (e.g., first device 150). For example, event authorization computing platform 110 may send, via the communication interface (e.g., communication interface 113), to the first device (e.g., first device 150) and/or one or more trusted devices associated with the first device (e.g., first device 150), at least one alert message of the one or more alert messages. Event authorization computing platform 110 may send one or more alert messages to the enterprise user computing device (e.g., enterprise user computing device 140). For example, event authorization computing platform 110 may send, via the communication interface (e.g., communication interface 113), to the enterprise user computing device (e.g., enterprise user computing device 140), at least one alert message of the one or more alert messages.

The techniques described herein are based on near-real time authentication of events and exchange of data and communications between multiple devices over multiple communication channels. Such activities are enabled by at least the high bandwidth, low latency, high data transmission rates, and/or location accuracies associated with evolving high generation cellular networks (e.g., public network 180), that may optionally be configured for seamless communications with local networks (e.g., local network 190), and/or private networks (e.g., private network 170).

Figure 5:
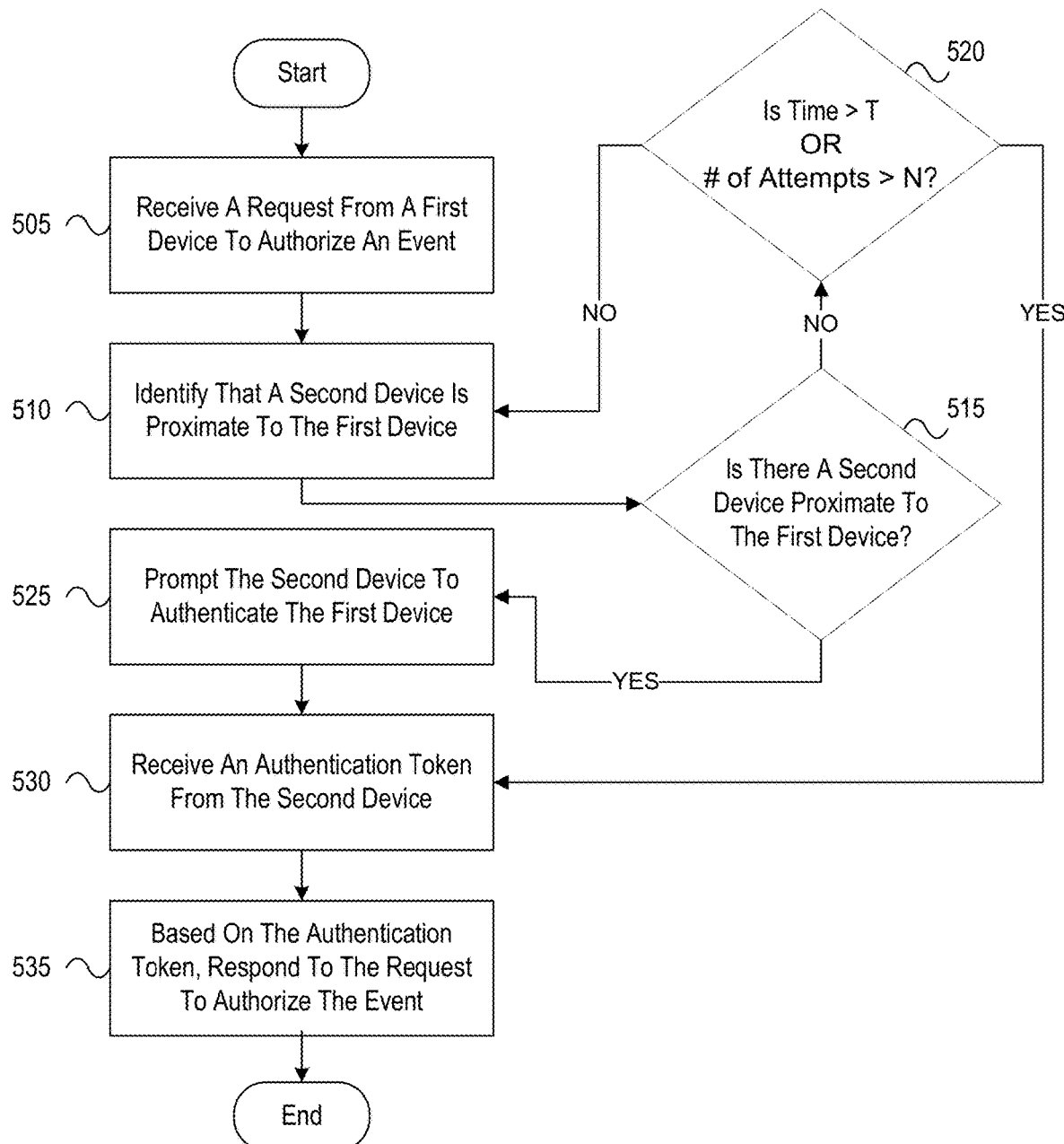
FIG. 5 depicts an illustrative method for authorizing an event by utilizing a high generation cellular network to authenticate a device associated with the event in accordance with one or more example embodiments.

FIG. 5 depicts an illustrative method for authorizing an event by utilizing a high generation cellular network to authenticate a device associated with the event in accordance with one or more example embodiments. Referring to FIG. 5, at step 505, a computing platform having at least one processor, a communication interface, and memory may receive, by the at least one processor, via the communication interface, from a first device, a request to authorize an event. At step 510, the computing platform may identify, based on an analysis of location data, that a second device is proximate to the first device. At step 515, the computing platform may determine if a second device proximate to the first device has been identified. If at step 515, the computing platform determines that a second device is not identified and/or an identified second device is not proximate to the first device, the computing platform may continue to step 520. At step 520, the computing platform may determine if a time taken has exceeded a predetermined first threshold T (e.g., the computing platform has not been able to identify a second device proximate to the first device within a time threshold), or if a number of attempts has exceeded a predetermined first threshold N (e.g., the computing platform has not been able to identify a second device proximate to the first device within N attempts).

If at step 520, the computing platform determines that the time taken has exceeded the predetermined first threshold T, or the number of attempts has exceeded the predetermined first threshold N, the computing platform may continue to step 530, where the authentication token is indicative of a failure to authenticate the first device.

If at step 520, the computing platform determines that the time taken has not exceeded the predetermined first threshold T, and the number of attempts has not exceeded the predetermined first threshold N, the computing platform may return to step 510 to identify, based on an analysis of location data, that a second device is proximate to the first device. In some embodiments, a plurality of devices may be identified, and a second device may be selected from the plurality of devices based on proximity.

If at step 515, the computing platform determines that a second device proximate to the first device has been identified, the computing platform may continue to step 525. At step 525, the computing platform may prompt the second device to authenticate the first device. At step 530, the computing platform may receive, from the second device, an authentication token indicating whether the first device is authenticated. At step 535, the computing platform may respond, based on the authentication token, to the request to authorize the event.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform, comprising:
   at least one processor;
   a communication interface communicatively coupled to the at least one processor; and
   memory storing computer-readable instructions that, when executed by the at least one processor, cause the computing platform to:
   receive, via the communication interface, from a first device, a request to authorize an event;
   identify, based on an analysis of location data, that a plurality of devices is proximate to the first device, wherein the plurality of devices includes a second device;
   prompt the second device to authenticate the first device, wherein the first and second devices are associated with first and second users, respectively;
   receive, through the second device, an authentication token indicating whether the first device is authenticated;
   respond, based on the authentication token, to the request to authorize the event; and
   when a risk level of the event is above a first predetermined risk threshold, determine that a supplemental authentication via device-to-device communication over a local network is required, wherein the computing platform:
   provides the authentication token to the second device;
   determines a first location of the first device and a second location of the second device; and
   only when a difference between the first and second locations are within a first predetermined distance, initiates the device-to-device communication between the first and second devices, wherein the communication is enabled by an authentication process to be executed in a background via automatic exchange between the first device and the second device;

in response to the initiating, causing the second device to transmit the authentication token to the first device over the local network; and in response to the causing, receiving the authentication token from the first device.

2. The computing platform of claim 1, wherein the computer-readable instructions that cause the computing platform to receive the authentication token comprise additional computer-readable instructions that, when executed by the at least one processor, cause the computing platform to:

cause the second device to send, via a local network, the authentication token to the first device; and receive the authentication token from the first device.

3. The computing platform of claim 1, wherein prompting the second device to authenticate the first device comprises providing, to the second device, information related to the first device, and prompting the second device to verify the information.

4. The computing platform of claim 3, wherein the information related to the first device comprises information associated with a user associated with the first device.

5. The computing platform of claim 1, wherein prompting the second device to authenticate the first device comprises determining a confidence level associated with the second device, wherein the first and second devices are associated with different users.

6. The computing platform of claim 5, wherein the computer-readable instructions that cause the computing platform to determine the confidence level comprise additional computer-readable instructions that, when executed by the at least one processor, cause the computing platform to:

identify an association, in a repository of user devices, between the first device and the second device; and determine the confidence level based on the identified association.

7. The computing platform of claim 5, wherein the computer-readable instructions that cause the computing platform to determine the confidence level comprise additional computer-readable instructions that, when executed by the at least one processor, cause the computing platform to:

receive biometric information associated with a user associated with the second device; and determine the confidence level of the second device based on the biometric information.

8. The computing platform of claim 7, wherein the memory stores additional computer-readable instructions that, when executed by the at least one processor, cause the computing platform to:

compare the received biometric information with known biometric information associated with the user associated with the second device;

detect, based on the comparing, duress involving the user associated with the second device; and in response to detecting the duress, deny the request to authorize the event.

9. The computing platform of claim 1, wherein responding to the request to authorize the event comprises confirming the request, and wherein the memory stores additional computer-readable instructions that, when executed by the at least one processor, cause the computing platform to:

add, based on the authentication token, a digital witness to a document associated with the event.

10. The computing platform of claim 1, wherein the computer-readable instructions that cause the computing platform to identify the second device comprise additional computer-readable instructions that, when executed by the at least one processor, cause the computing platform to:

access a repository of trusted devices; and confirm that the plurality of devices is in the repository of trusted devices.

11. The computing platform of claim 1, wherein receiving the authentication token comprises detecting an absence of a response to a prompt within a time threshold, and wherein the computer-readable instructions that cause the computing platform to respond, based on the authentication token, to the request to authorize the event, comprise additional computer-readable instructions that, when executed by the at least one processor, cause the computing platform to:

identify, based on the analysis of the location data, that a third device is proximate to the first device;

prompt the third device to authenticate the first device;

receive, from the third device, a second authentication token indicating whether the first device is authenticated; and respond, based on the second authentication token, to the request to authorize the event.

12. The computing platform of claim 1, wherein the memory stores additional computer-readable instructions that, when executed by the at least one processor, cause the computing platform to:

after receiving, from the first device, the request to authorize the event, establish, with the first device, a first communication channel;

after identifying that the second device is proximate to the first device, establish, with the second device, a second communication channel different from the first communication channel;

wherein prompting the second device to authenticate the first device occurs via the second communication channel; and wherein responding to the request to authorize the event occurs via the first communication channel.

13. The computing platform of claim 1, wherein the memory stores additional computer-readable instructions that, when executed by the at least one processor, cause the computing platform to:

identify, based on the analysis of the location data, that a third device is proximate to the first device and to the second device;

in response to the second device successfully authenticating the first device, prompt the third device to authenticate the second device;

receive, from the third device, a second authentication token indicating whether the second device is authenticated; and respond, based on the second authentication token, to the request to authorize the event.

14. The computing platform of claim 1, wherein the authentication token is indicative of a failure to authenticate the first device, and wherein the memory stores additional computer-readable instructions that, when executed by the at least one processor, cause the computing platform to:

in response to the failure to authenticate the first device, deny the request to authorize the event.

15. The computing platform of claim 14, wherein the memory stores additional computer-readable instructions that, when executed by the at least one processor, cause the computing platform to:
  detect, in response to the failure to authenticate the first device, unauthorized activity involving the first device; and
  generate one or more alert messages comprising alert information associated with the unauthorized activity involving the first device.

16. The computing platform of claim 1, wherein the memory stores additional computer-readable instructions that, when executed by the at least one processor, cause the computing platform to:
  determine, based on the analysis of the location data if a third device associated with the first device is proximate to the first device; and
  detect, in response to a failure to determine that the third device is proximate to the first device, unauthorized activity involving the first device.

17. A method, comprising:
  at a computing platform comprising at least one processor, a communication interface, and memory:
    receiving, by the at least one processor, via the communication interface, from a first device, a request to authorize an event;
    identifying, based on an analysis of location data, that a second device is proximate to the first device;
    prompting the second device to authenticate the first device, wherein the prompting comprises determining a confidence level associated with the second device, wherein the first and second devices are associated with different users;
    receiving, through the second device, an authentication token indicating whether the first device is authenticated;
    responding, based on the authentication token, to the request to authorize the event; and
    when a risk level of the event is above a predetermined risk threshold, determine that a supplemental authentication via device-to-device communication over a local network is required, wherein the computing platform:
      provides the authentication token to the second device;
      determines a first location of the first device and a second location of the second device; and
      only when a difference between the first and second locations are within a predetermined distance, initiates the device-to-device communication between the first and second devices, wherein the communication is enabled by an authentication process to be executed in a background via automatic exchange between the first device and the second device;
      in response to the initiating, causing the second device to transmit the authentication token to the first device over the local network; and
      in response to the causing, receiving the authentication token from the first device.

18. The method of claim 17 further comprising:
  causing the second device to send, via a local network, the authentication token to the first device; and
  receiving the authentication token from the first device.

19. One or more non-transitory computer-readable media storing instructions that, when executed by a computing platform comprising at least one processor, a communication interface, and memory, cause the computing platform to:
  receive, via the communication interface, from a first device, a request to authorize an event;
  identify, based on an analysis of location data, that a plurality of devices is proximate to the first device, wherein the plurality of devices includes a second device;
  prompt the second device to authenticate the first device, wherein the first and second devices are associated with first and second users, respectively;
  receive, through the second device, an authentication token indicating whether the first device is authenticated;
  respond, based on the authentication token, to the request to authorize the event; and
  when a risk level of the event is above a predetermined risk threshold, determine that a supplemental authentication via device-to-device communication over a local network is required, wherein the computing platform:
    provides the authentication token to the second device;
    determines a first location of the first device and a second location of the second device; and
    only when a difference between the first and second locations are within a predetermined distance, initiates the device-to-device communication between the first and second devices, wherein the communication is enabled by an authentication process to be executed in a background via automatic exchange between the first device and the second device;
    in response to the initiating, causing the second device to transmit the authentication token to the first device over the local network; and
    in response to the causing, receiving the authentication token from the first device.

20. The one or more non-transitory computer-readable media of claim 19 storing instructions that, when executed by the computing platform cause the computing platform to:
  determine a confidence level associated with the second device, wherein the first and second devices are associated with different users.

* * * * *